(12) United States Patent
Severinsson et al.

(10) Patent No.: US 10,030,755 B2
(45) Date of Patent: Jul. 24, 2018

(54) TORQUE VECTORING DEVICE

(71) Applicant: BorgWarner TorqTransfer Systems AB, Landskrona (SE)

(72) Inventors: Lars Severinsson, Hishult (SE); Kristoffer Nilsson, Lund (SE); Gustaf Lagunoff, Umeå (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 0 days.

(21) Appl. No.: 15/308,176

(22) PCT Filed: May 6, 2015

(86) PCT No.: PCT/EP2015/059925
§ 371 (c)(1),
(2) Date: Nov. 1, 2016

(87) PCT Pub. No.: WO2015/169837
PCT Pub. Date: Nov. 12, 2015

(65) Prior Publication Data
US 2017/0059023 A1 Mar. 2, 2017

(30) Foreign Application Priority Data

May 6, 2014 (SE) ...................................... 1450539
Jul. 1, 2014 (SE) ...................................... 1450811
(Continued)

(51) Int. Cl.
*F16H 48/36* (2012.01)
*B60K 6/48* (2007.10)
(Continued)

(52) U.S. Cl.
CPC ............... *F16H 48/36* (2013.01); *B60K 6/48* (2013.01); *B60K 6/52* (2013.01); *B60K 17/165* (2013.01);
(Continued)

(58) Field of Classification Search
None
See application file for complete search history.

(56) References Cited

U.S. PATENT DOCUMENTS 5,437,583 A * 8/1995 Shibahata ............... B60K 23/04
475/151
8,388,480 B2 * 3/2013 Troennberg ............. B60K 6/52
475/150
(Continued)

FOREIGN PATENT DOCUMENTS

DE 102010036240 A1 3/2012
DE 102013202382 A1 * 8/2014 ............... B60K 6/48
(Continued)

OTHER PUBLICATIONS

EP Office Action dated Oct. 6, 2017 for EP Application No. 15720726.7, Applicant: BorgWarner Sweden AB, 4 pages total.

*Primary Examiner* — Dirk Wright
(74) *Attorney, Agent, or Firm* — BrooksGroup

(57) ABSTRACT

A torque vectoring device for a vehicle is provided, comprising an electrical motor (110) being connected to a differential mechanism (20) via a transmission (120), wherein the torque vectoring device further comprises at least one control means (130, 150) for changing the torque path of the transmission (120) between a first mode, in which the transmission connects the electrical motor (110) to the input shaft of the differential mechanism (20) for hybrid drive mode, and a second mode, in which the transmission
(Continued)

connects the electrical motor (110) to the output shaft of the differential mechanism (20) for torque vectoring mode.

13 Claims, 35 Drawing Sheets

(30) Foreign Application Priority Data

| Aug. 29, 2014 | (SE) | .................. | 1451002 |
|---|---|---|---|
| Sep. 19, 2014 | (SE) | .................. | 1451106 |
| Dec. 23, 2014 | (SE) | .................. | 1451657 |
| Jan. 8, 2015 | (SE) | .................. | 1550009 |

(51) Int. Cl.
*B60K 17/16* (2006.01)
*B60K 17/346* (2006.01)
*B60K 6/52* (2007.10)
*F16H 37/08* (2006.01)

(52) U.S. Cl.
CPC ....... *B60K 17/3462* (2013.01); *F16H 37/082* (2013.01); *B60K 2006/4808* (2013.01); *B60K 2006/4825* (2013.01); *B60Y 2300/82* (2013.01); *B60Y 2400/804* (2013.01); *F16H 2048/364* (2013.01); *F16H 2200/0034* (2013.01); *F16H 2200/201* (2013.01); *F16H 2200/2007* (2013.01); *F16H 2200/2035* (2013.01); *F16H 2200/2097* (2013.01); *Y02T 10/626* (2013.01); *Y02T 10/6221* (2013.01); *Y02T 10/6265* (2013.01); *Y10S 903/93* (2013.01)

(56) References Cited

U.S. PATENT DOCUMENTS

| 8,663,051 | B2 * | 3/2014 | Sten .................. | F16H 48/36 |
|---|---|---|---|---|
| | | | | 475/150 |
| 9,306,433 | B2 * | 4/2016 | Sten .................. | H02K 9/193 |
| 9,353,852 | B2 * | 5/2016 | Gieryluk ................ | F16H 59/02 |
| 9,701,187 | B2 * | 7/2017 | Smetana ................ | B60K 6/365 |
| 2011/0039650 | A1 | 2/2011 | Rosemeier et al. | |

FOREIGN PATENT DOCUMENTS

| EP | 1787846 | A1 | 5/2007 | | |
|---|---|---|---|---|---|
| WO | 2006068607 | A1 | 6/2006 | | |
| WO | WO-2008008705 | A2 * | 1/2008 | ............. | F16H 48/08 |
| WO | 2010101506 | A1 | 9/2010 | | |
| WO | 2012066035 | A1 | 5/2012 | | |
| WO | 2012082059 | A1 | 6/2012 | | |
| WO | 2014124639 | A2 | 8/2014 | | |

\* cited by examiner

TORQUE VECTORING DEVICE

This application claims the benefit of Swedish Application No. 1450539-0 filed May 6, 2014, Swedish Application No. 1450811-3 filed Jul. 1, 2014, Swedish Application No. 1451002-8 filed Aug. 29, 2014, Swedish Application No. 1451106-7 filed Sep. 19, 2014, Swedish Application No. 1451657-9 filed Dec. 23, 2014, Swedish Application No. 1550009-3 filed Jan. 8, 2015 and PCT Application No. EP2015/059925 filed May 6, 2015.

TECHNICAL FIELD

The present invention relates to a torque vectoring device. More particularly, the present invention relates to a torque vectoring device which may be controlled to operate in at least a first mode as well as in a second mode.

BACKGROUND

In modern four wheeled vehicles, such as cars, electrical motors may provide an alternative to the traditional combustion engines, as well as providing additional control of drive torque distribution by so called torque vectoring.

In case where the electrical motor is providing driving torque, such electrical propulsion motors may be arranged as the only driving unit of the vehicle, or in series or in parallel with a combustion engine thus forming a so called hybrid vehicle.

One example of a driving configuration including an electrical driving motor, as well as a torque vectoring motor, is described in WO2010101506 by the same applicant.

The electrical power system of today's passenger cars is based on 12V. Due to the relatively low voltage proposed solutions for high electrical power utilities, such as electrically powered propulsion units, require additional power supplies and high power electronics. This results in high currents which causes high losses and increased cable dimensions.

During recent years there is a trend of adding a 48V electrical power system to the already existing 12V system. As the electrical power increases new and improved solutions may be applicable, replacing the previous solutions requiring additional high power electronics.

One such example is the hybrid technology, i.e. the technology of adding electric drive to existing internal combustion engine drives, and allowing the vehicle to be driven either electrically, by the internal combustion engine, or both. The present applicant has previously presented several solutions for hybrid drive, e.g. as being described in WO2010101506 or in WO2012066035. These systems comprise a high power electrical motor for propulsion purposes, and a smaller electrical motor for torque vectoring purposes. Should 48V be available, it would be possible to develop a design for hybrid drive using only a single electrical motor, as well as a transmission being configured to be shifted between a first mode in which the electrical motor is used as a secondary drive source for propulsion, and a second mode in which the electrical motor is used for redistributing driving torque (i.e. from the primary drive).

An electrical motor, either used for propulsion, torque vectoring, or both, may be equipped with hydraulically actuated gears in order to provide a wider range of operating parameters of the electrical motor, e.g. with respect to torque output and rotational speed.

In addition to this, there is also a need for cooling the electrical machine. This may be done by supplying oil to the electrical machine, in which the cooling oil is circulated around the rotating parts of the electrical machine.

The use of a shifting mechanism for actuating a gear switch, as well as an electrical motor for propulsion, torque vectoring, or both requires two hydraulic systems. In order to reduce complexity and costs it would therefore be advantageous with a single hydraulic system capable of providing gear switch as well as cooling.

SUMMARY

It is an object of the present invention to provide a torque vectoring device, or a hybrid drive device, which may be easily configured for dual mode operation, i.e. hybrid drive and torque vectoring. The torque vectoring device is configured to operate on a medium to high voltage, such as 48V, although being substantially lower than the existing high voltage systems for hybrid technology (e.g. 300V).

According to a further aspect, a torque vectoring device is provided.

According to a specific aspects torque vectoring devices according to the independent claims are provided. Preferred embodiments are defined by the appended dependent claims.

BRIEF DESCRIPTION OF DRAWINGS

The invention will be described in further detail under reference to the accompanying drawings in which:

FIG. 2b is a cross-sectional view of the device shown in FIG. 2a;

FIG. 9b is a cross-sectional view of the device shown in FIG. 9a;

FIG. 9c is an isometric view of the device shown in FIG. 9a;

FIG. 10e is a cross-sectional view of the device shown in FIG. 10a;

FIG. 10f is an isometric view of the device shown in FIG. 10a;

FIG. 11b is a cross-sectional view of the device shown in FIG. 11a;

FIG. 11c is an isometric view of the device shown in FIG. 11a;

FIG. 12b is an isometric view of the device shown in FIG. 12a;

FIG. 14d is a cross-sectional view of the device shown in FIG. 14a;

FIG. 14e is an isometric view of the device shown in FIG. 14a;

FIG. 16b is a schematic view of the torque vectoring device shown in FIG. 16a;

FIG. 21b is a cross-sectional view of the torque vectoring device shown in FIG. 20 and in FIG. 21a.

DETAILED DESCRIPTION

In the following various embodiments of a torque vectoring device will be described. For all embodiments described with reference to FIGS. 1-49, the torque vectoring devices share a number of specific features, namely i) The torque vectoring device can be operated in at least two modes, of which one mode corresponds to a torque vectoring mode, and one mode corresponds to a driving mode;

ii) The torque vectoring device comprises a single motor which is connectable to a differential mechanism via a transmission, and wherein the electrical motor can couple to the transmission in two or more ways, corresponding to the different modes;

iii) The torque vectoring device may be implemented in vehicles, such as passenger cars, in many different ways as well as for many different types of driving configurations.

Figure 50:
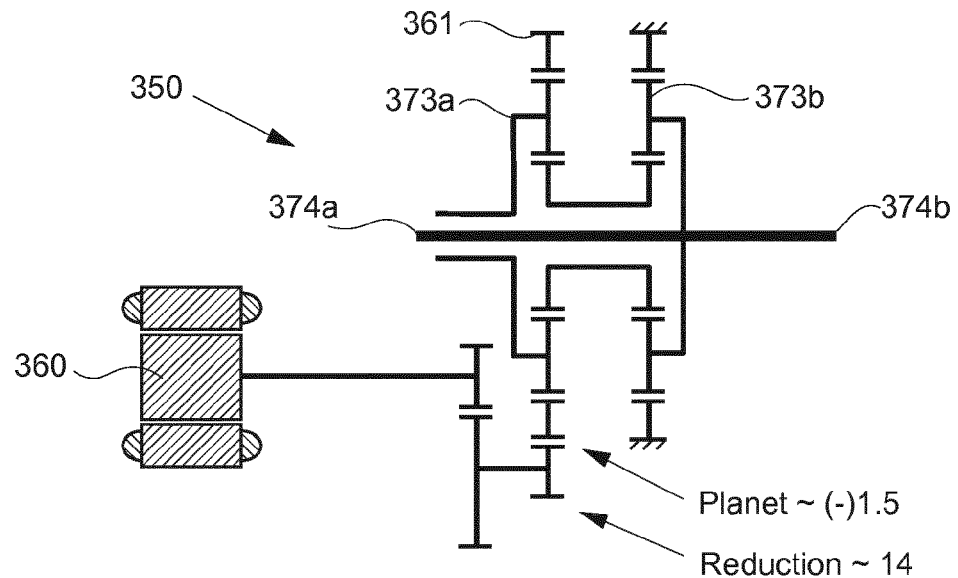
FIG. 50 is a schematic view of a transmission layout according to one embodiment of a torque vectoring device.
Figure 51:
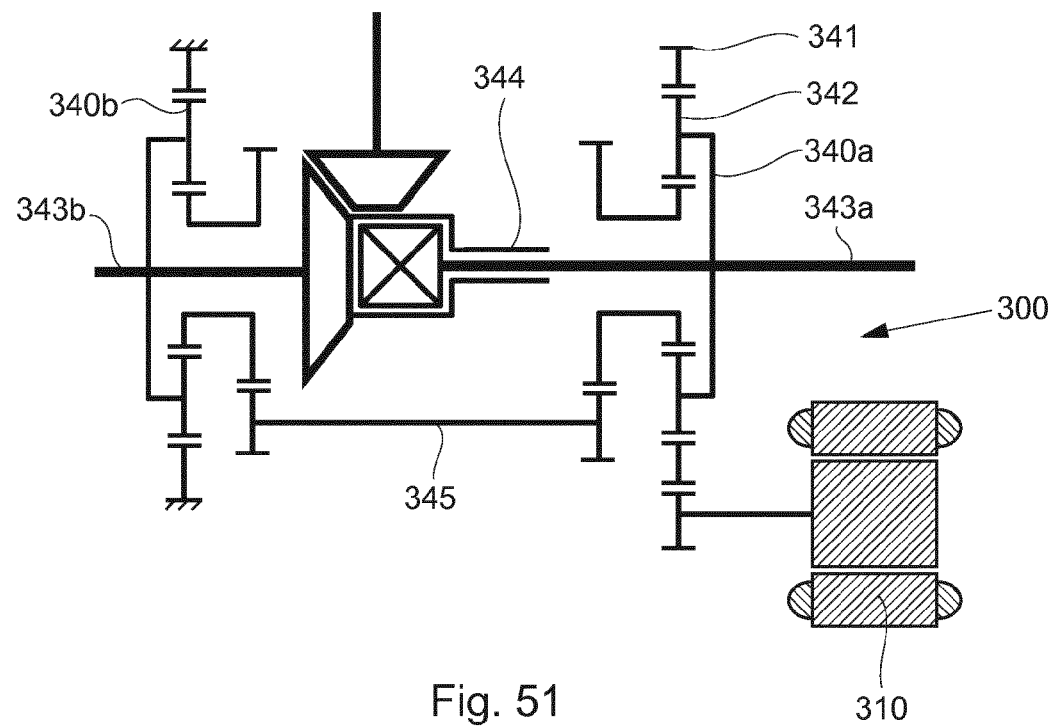
FIG. 51 is a schematic view of a transmission layout according to one embodiment of a torque vectoring device.

For the embodiments shown in FIGS. 50-51, the torque vectoring device connects to the vehicle axle in only one mode, namely torque vectoring mode.

Before describing the torque vectoring device in detail, some general comments will be given. Hybrid drive is normally desired for passenger cars or other four-wheeled vehicles. Hybrid drive may either represent the possibility to change driving source from an internal combustion engine to an electrical motor or vice versa, or the possibility to use an electrical motor driving a front or rear axle, in addition to an internal combustion engine driving the other one of the front or rear axle, in order to provide all wheel drive.

One typical example of a driveline configuration for which the torque vectoring device is particularly applicable is a four wheeled vehicle, such as a passenger car, having an internal combustion engine driving the front axle, and an electrically driven rear axle. The rear axle is driven by means of a torque vectoring device according to any of the embodiments described herein, and the vehicle may be driven by the internal combustion engine only (i.e. front wheel drive), the torque vectoring device only (i.e. rear wheel drive), or the internal combustion engine in combination with the torque vectoring device (i.e. all wheel drive). As will be understood from below, the torque vectoring device may provide torque vectoring when the internal combustion engine is driving the vehicle.

Further to this, the front axle may in some embodiments be connectable with the rear axle for allowing all wheel drive by means of the internal combustion engine (or any other propulsion unit normally driving the front axle). The connection may e.g. be implemented by means of a limited slip coupling and a cardan shaft whereby the torque vectoring device, when operated in a torque vectoring mode, provides a torque transfer between the rear wheels.

It should be understood that various driveline configurations are applicable for the torque vectoring device of the present application; e.g. the torque vectoring device could be used with an all-electric vehicle, it may be arranged on the front axle instead of the rear axle, etc. Further to this, the torque vectoring device may also be used with a transfer case as will be described with reference to FIG. 19.

The presented embodiments have been developed and invented as solutions for predetermined conditions. For a typical passenger car operating on 48V it is assumed that the maximum wheel speed is approximately 2000 rpm, corresponding to a vehicle speed of 250 km/h. It is further assumed that hybrid drive is limited to 100 km/h, and the maximum speed of the electrical motor of the torque vectoring device is 16000 rpm. The maximum torque for torque vectoring is assumed to be 1200 Nm, and the desired gear reduction for torque vectoring is assumed to be 20. Further assuming that the efficiency of the complete transmission (gears and differential) is 90%, while the efficiency of the gears only is 95%, the maximum torque of the electrical motor is calculated to be approximately 67 Nm. The maximum torque applied to the wheels is correspondingly calculated to be approximately 1250 Nm during hybrid operation.

Now turning to FIG. 1 an embodiment of a torque vectoring device 100 will be described. The torque vectoring device 100 is arranged on an axle 10 of a vehicle 1. The axle 10 comprises a differential mechanism 20. The torque vectoring device 100 is arranged on one side of the differential mechanism 20 and comprises an electrical motor 110 and a transmission 120 for connecting the electrical motor 110 with the differential 20 in at least two different ways.

The torque vectoring device comprises two clutches 130a, 130b, and two planetary gear sets 140a, 140b. The electrical motor 110 drives the sun gear of the first planetary gear set 140a. When the first clutch 130a is actuated such that it brakes the ring gear of the first planetary gear set 140a, input torque from the electrical motor 110 is provided to the input shaft of the differential mechanism 20 via the planet carrier of the first planetary gear set 140a. Hence, the torque vectoring device 100 drives the axle 10. Should the first clutch 130a open, while the second clutch 130b engages, torque from the electrical motor 110 will be added, or subtracted, from the already existing driving torque on the right side of the differential. Hence torque vectoring is achieved. The clutches 130a, 130b may be any kind of suitable clutch known in the art. The reduction (electrical motor to differential) may be in the range of 5:1.

Figure 1:
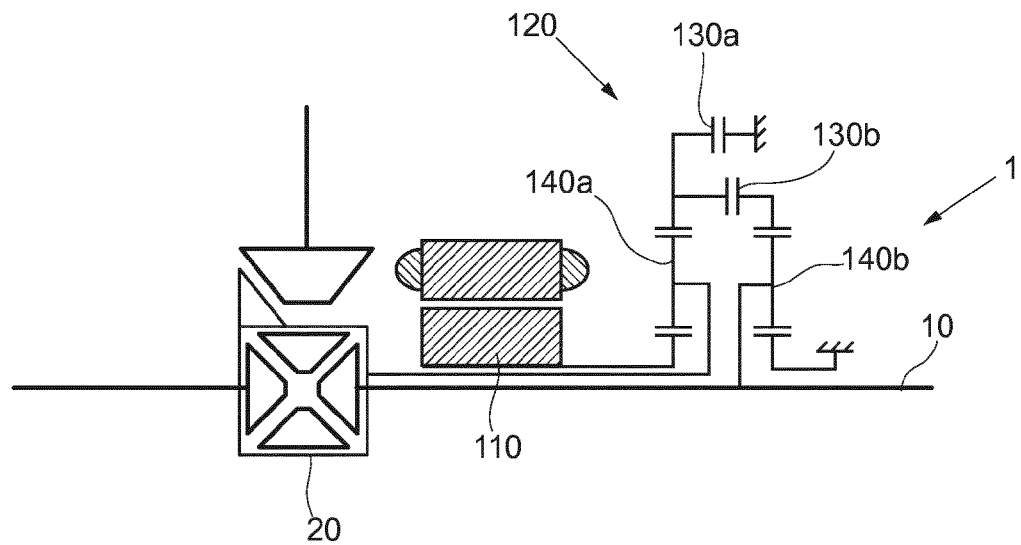
FIG. 1 is a schematic cross-sectional view of a torque vectoring device according to an embodiment.
Figure 2A:
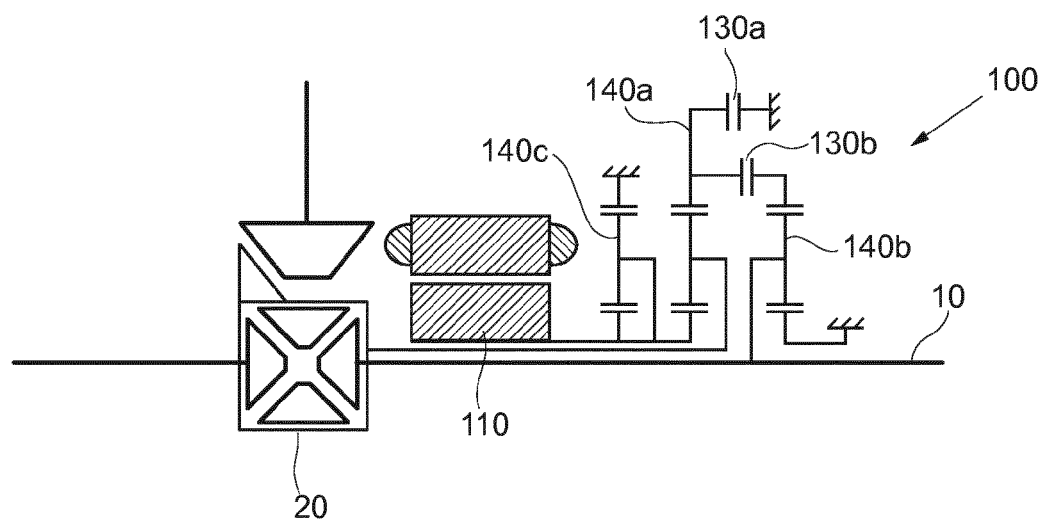
FIG. 2a is a schematic cross-sectional view of a torque vectoring device according to an embodiment.
Figure 2B:
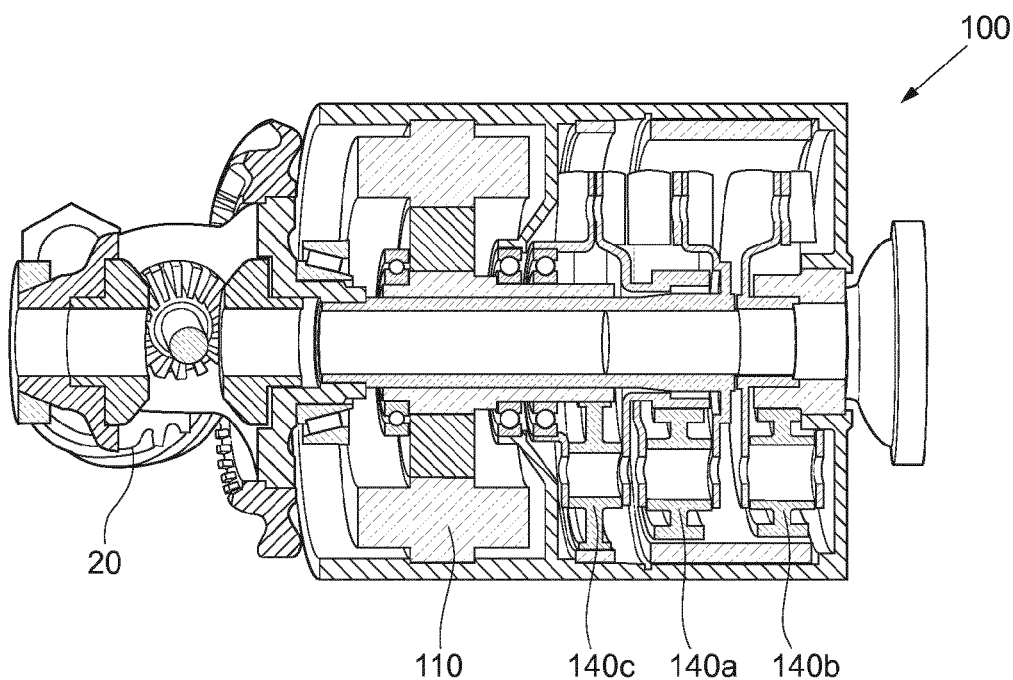

In FIGS. 2a and 2b another embodiment of a torque vectoring device 100 is shown. The solution is similar to what is shown in FIG. 1, however a yet further planetary gear set 140c is added for increasing the reduction. If each planetary gear set provides a reduction of 5:1, the total reduction of the transmission 120 of the torque vectoring device 100 will be 25:1.

Figure 3:
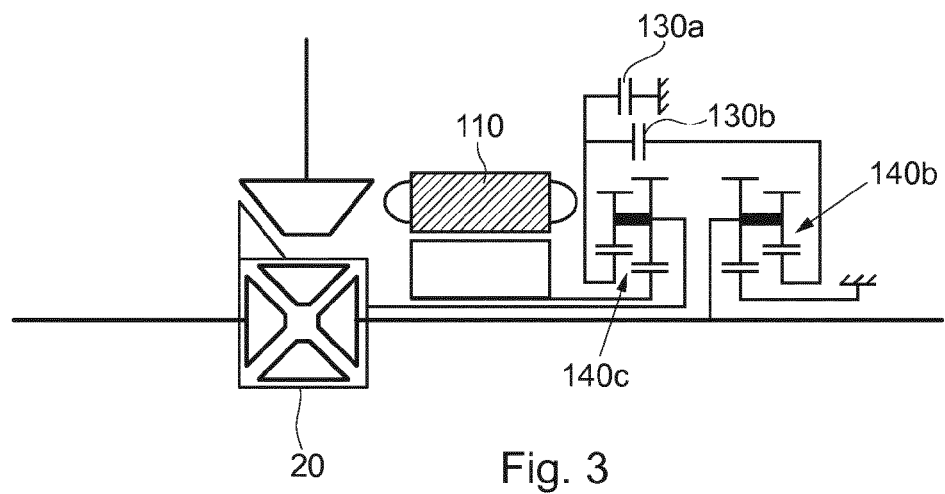
FIG. 3 is a schematic cross-sectional view of a torque vectoring device according to an embodiment.

FIG. 3 shows a further embodiment of a torque vectoring device 100. The planetary gears 140a-c of FIG. 2 are replaced by planetary gears 140a, 140b, for which the planet carriers has two gears whereby the first sun gear of the first planetary gear set 140a, driven by the electrical motor, meshes with a first gear of the planet carrier, and wherein the sun gear, connecting with the second planetary gear 140b, meshes with a second gear of the planet carrier. When the first clutch 130a is engaged the electrical motor 110 will drive only the input shaft of the differential corresponding to hybrid drive. When the second clutch 130b is engaged the electrical motor 110 will connect with the input shaft and the output shaft of the differential, corresponding to torque vectoring mode in accordance with the principle described with reference to FIGS. 12a-b below.

Figure 4:
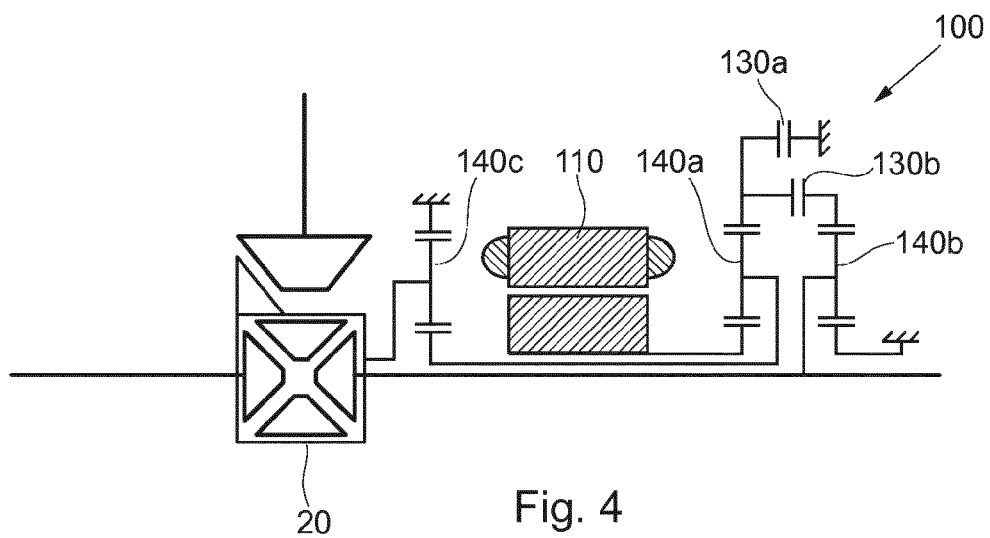
FIG. 4 is a schematic cross-sectional view of a torque vectoring device according to an embodiment.

FIG. 4 shows a further embodiment of a torque vectoring device 100 being similar to the embodiment shown in FIGS. 2a-b. However, the additional planetary gear 140c is arranged between the first planetary gear 140a and the differential 20; the additional planetary gear 140c will thus only be connected with the electrical motor 110, i.e. when the electrical motor 110 is connected to the input shaft of the differential mechanism 20.

Figure 5:
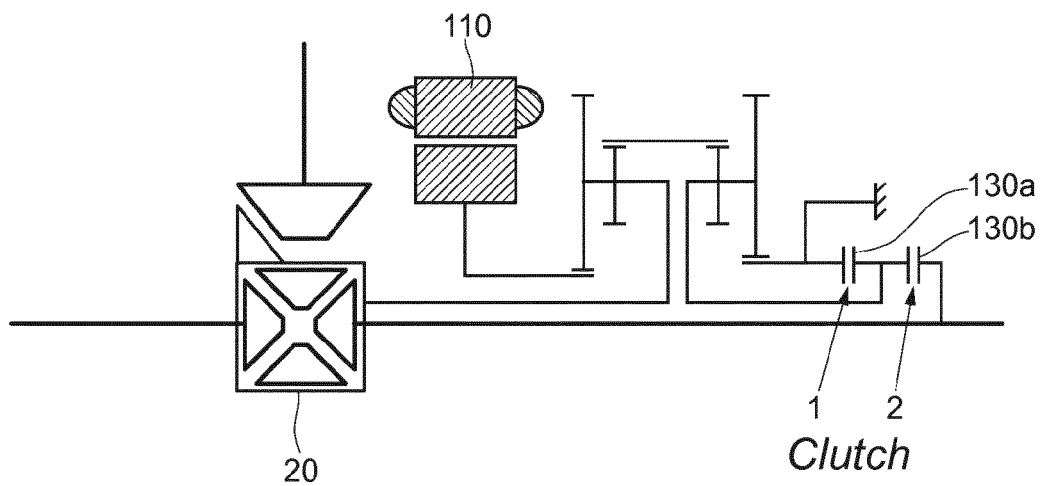
FIG. 5 is a schematic cross-sectional view of a torque vectoring device according to an embodiment.

In FIG. 5 yet further embodiment of a torque vectoring device 100 is shown, having a similar configuration compared to the embodiment of FIG. 3. When the first clutch 130a is engaged the electrical motor 110 will connect with the input shaft of the differential mechanism 20 for hybrid drive mode. When the second clutch 130b is engaged the electrical motor 110 will connect with the output shaft of the differential 20, thus operating in torque vectoring mode.

Figure 6:
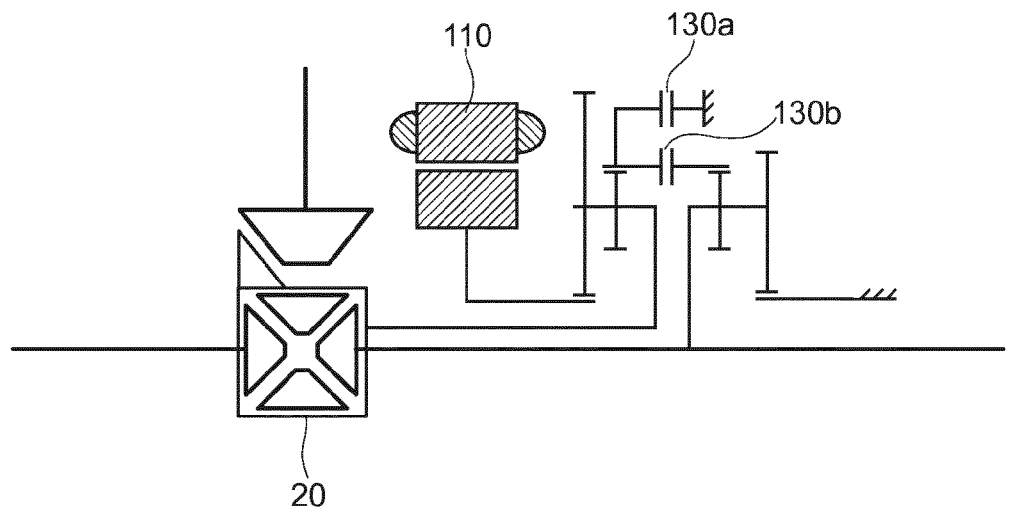
FIG. 6 is a schematic cross-sectional view of a torque vectoring device according to an embodiment.

FIG. 6 shows a further embodiment of a torque vectoring device 100. When the first clutch 130a is engaged, the electrical motor 110 will connect the input shaft of the differential mechanism 20 for hybrid drive. When the second clutch 130b is engaged the electrical motor 110 will connect with the output shaft of the differential 20.

Figure 7:
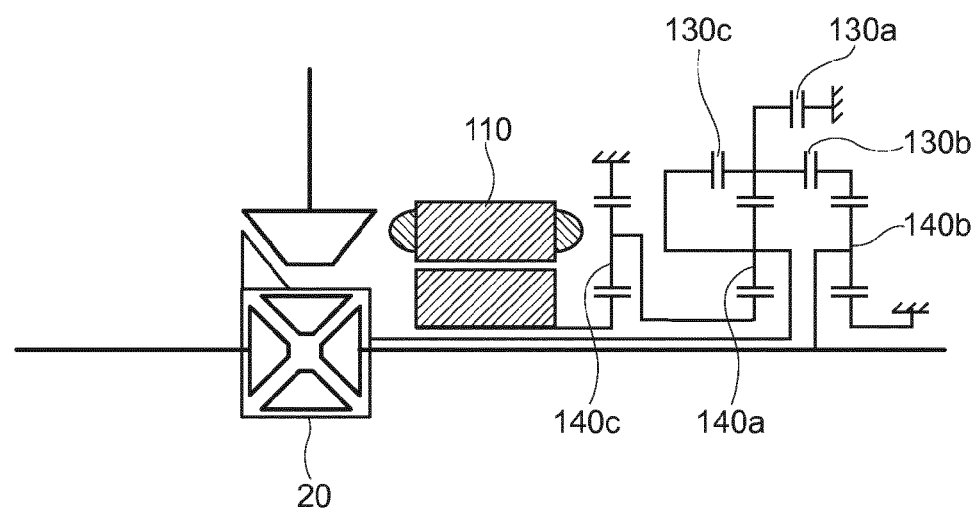
FIG. 7 is a schematic cross-sectional view of a torque vectoring device according to an embodiment.

In FIG. 7 an embodiment of a torque vectoring device 100 is shown. Similarly to what is shown in FIG. 2a, the torque vectoring device 100 has three planetary gears 140a, 140b, 140c. In addition the first and second clutches 130a, 130b, a third clutch 130c is provided for allowing the torque vectoring device 100 to operate in two-speed hybrid mode. Torque vectoring is achieved by having the first and third clutch 130a, 130c open, while closing the second clutch 130b. Low speed hybrid drive is achieved by closing the first clutch 130a, leaving the second and third clutch 130b, 130c open. The gear reduction is approximately 25:1. High speed hybrid drive is achieved by closing the third clutch 130c, leaving the first and second clutches 130a, 130b open.

Neutral, or disconnected mode is achieved by opening the first, second, and third clutch 130a, 130b, 130c.

Figure 8:
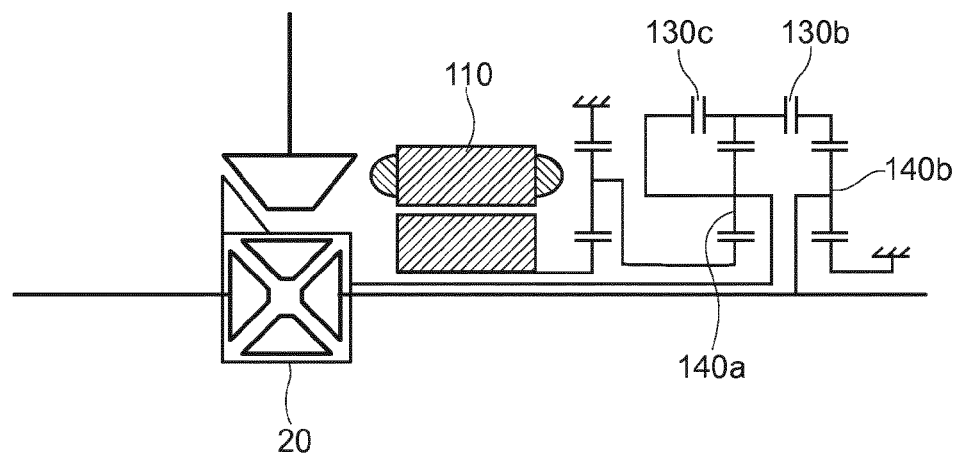
FIG. 8 is a schematic cross-sectional view of a torque vectoring device according to an embodiment.

FIG. 8 shows a modified torque vectoring device 100 in which the first clutch 130a is omitted compared to what has been described with reference to FIG. 7. Accordingly the low speed hybrid drive is no longer available; hybrid drive is achieved by having the second clutch 130b open, closing the third clutch 130c. Torque vectoring is achieved by closing the second clutch 130b leaving the third clutch open 130c.

Figure 9A:
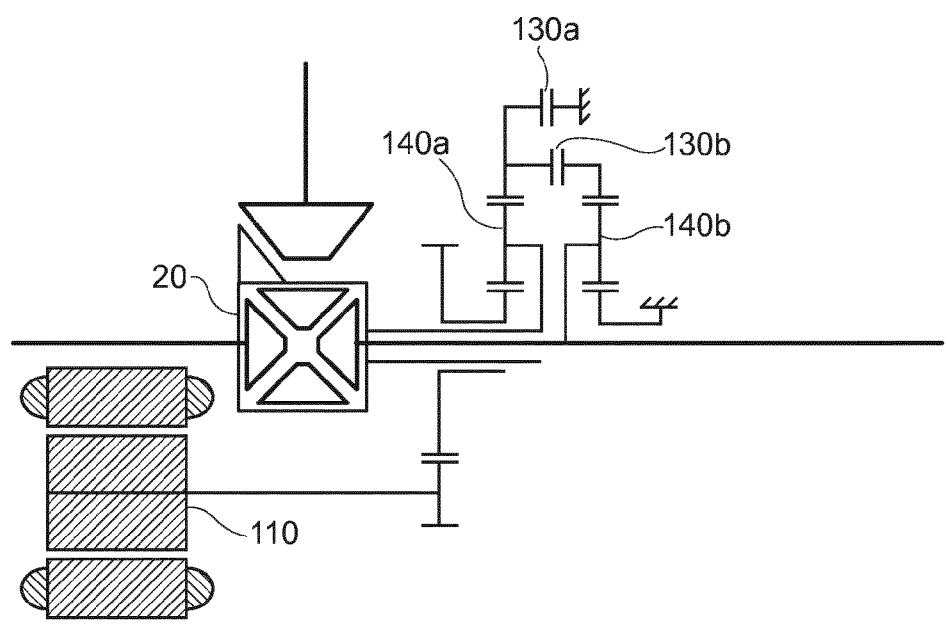
FIG. 9a is a schematic cross-sectional view of a torque vectoring device according to an embodiment.
Figure 9B:
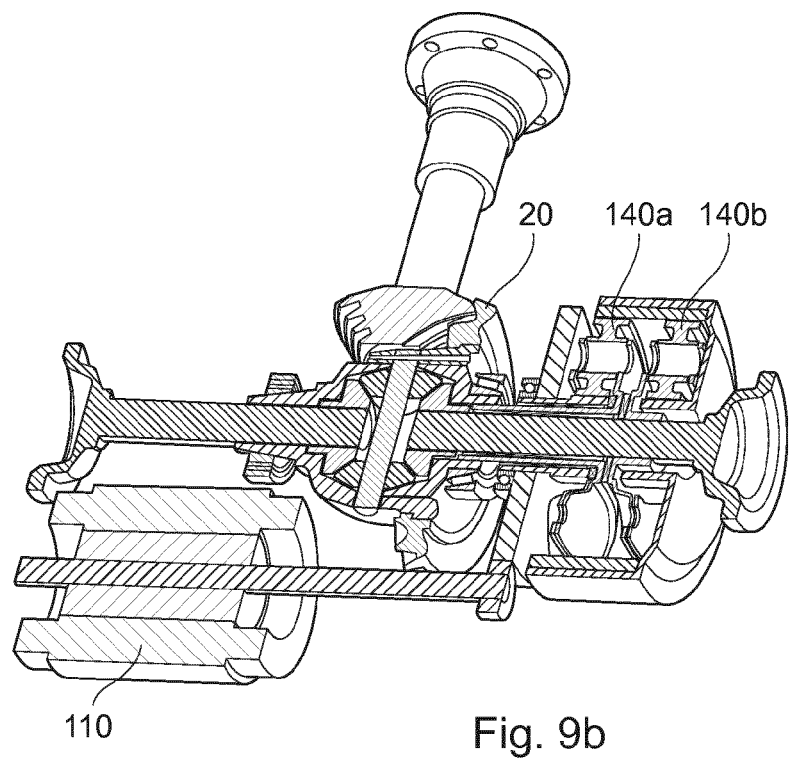
Figure 9C:
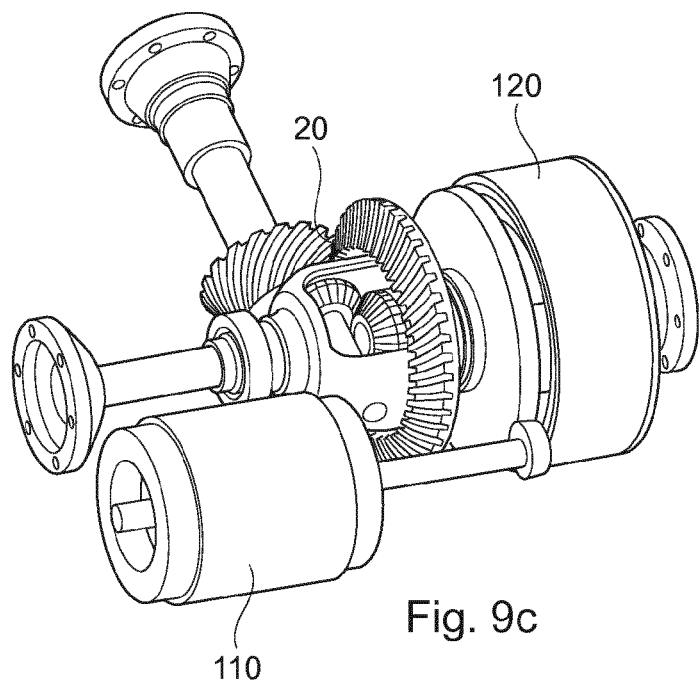

FIGS. 9a-c show a torque vectoring device 100 being similar to the embodiment shown in FIG. 1, although also including an additional reduction arranged between the electrical motor 110 and the sun gear of the first planetary gear 140a. Such reduction may be e.g. in the range of 3-4:1.

Figure 10A:
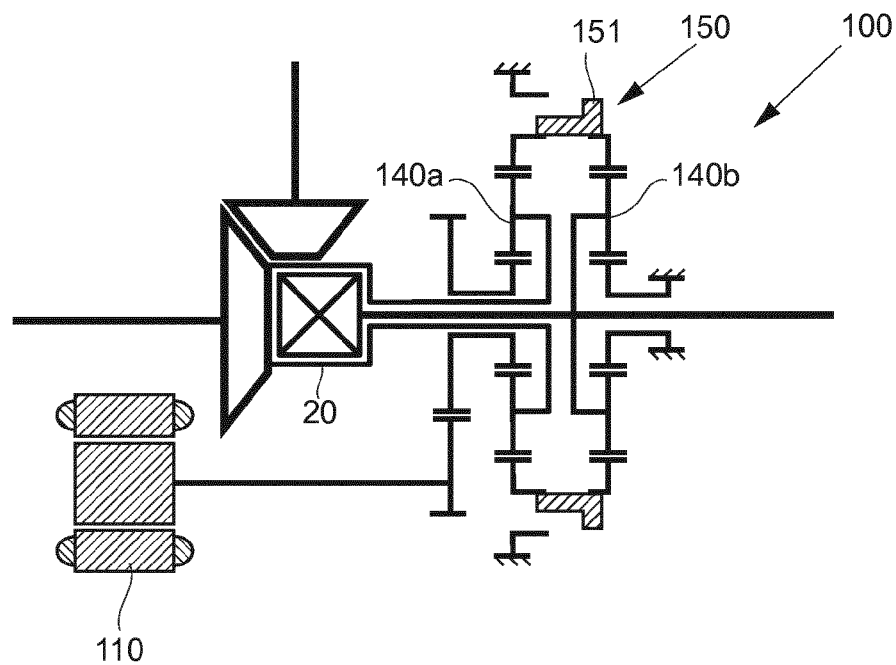
FIG. 10a is a schematic cross-sectional view of a torque vectoring device according to an embodiment when controlled to provide torque vectoring.
Figure 10B:
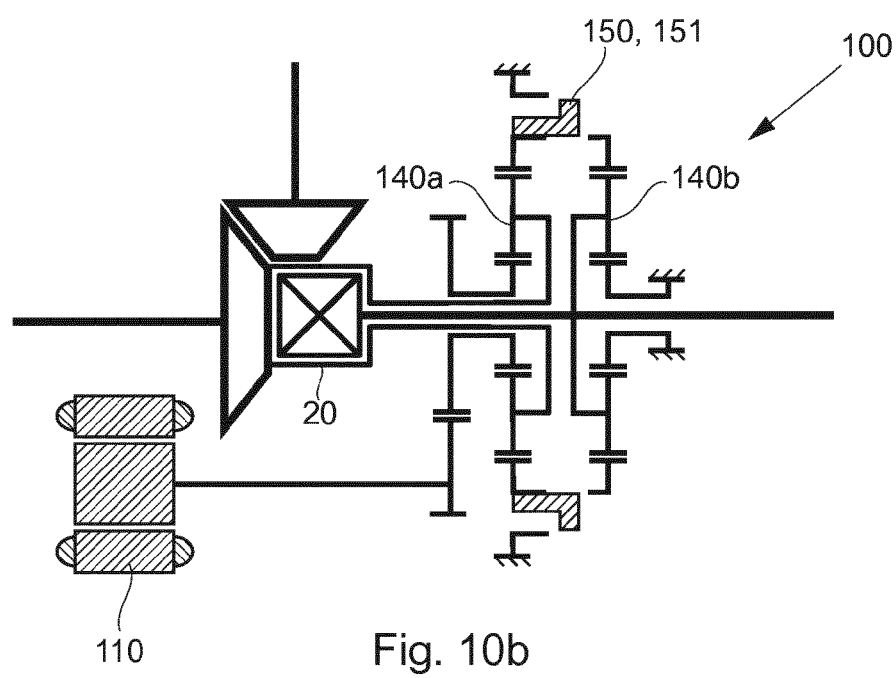
FIG. 10b is a schematic cross-sectional view of the device shown in FIG. 10a when controlled in a neutral, or disconnected state.
Figure 10C:
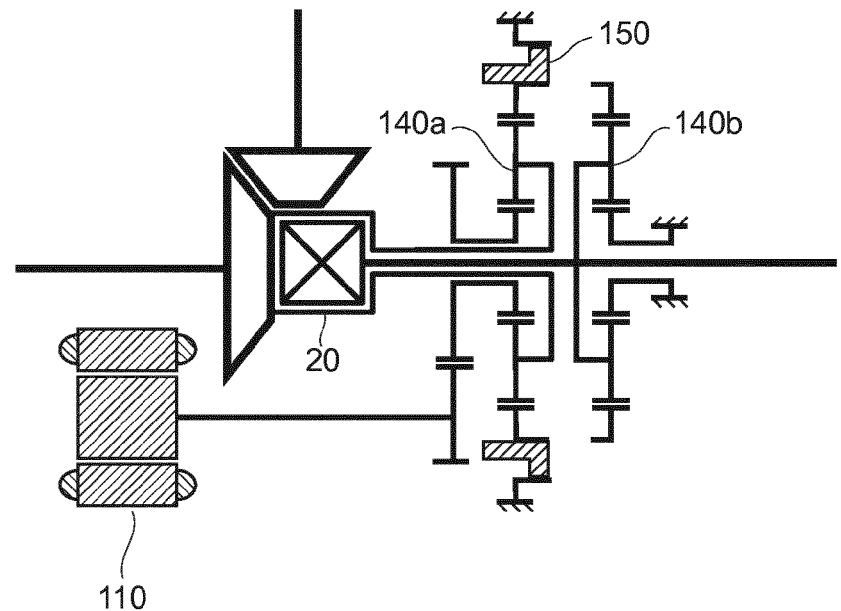
FIG. 10c is a schematic cross-sectional view of the device shown in FIG. 10a when controlled in a driving state.
Figure 10D:
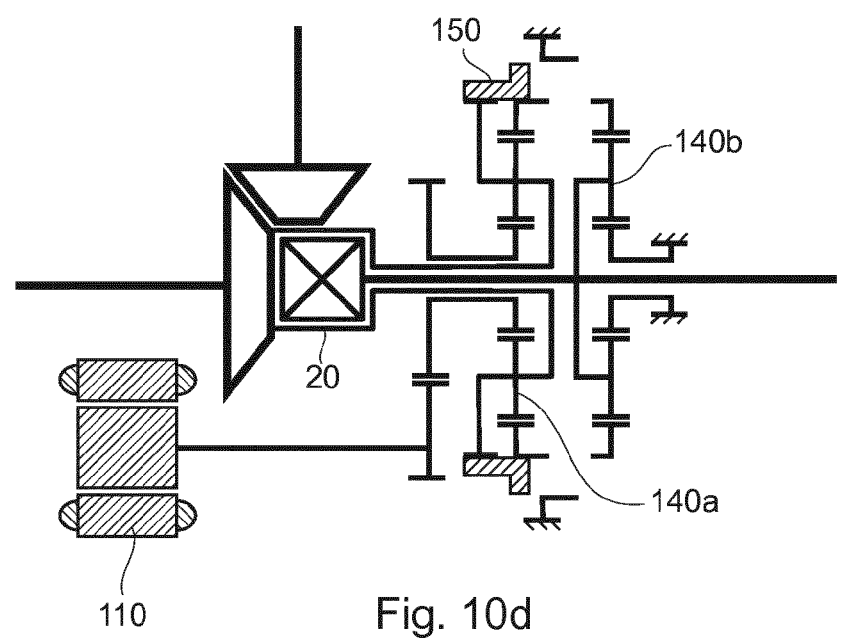
FIG. 10d is a schematic cross-sectional view of the device shown in FIG. 10a when controlled in a driving second gear state.
Figure 10E:
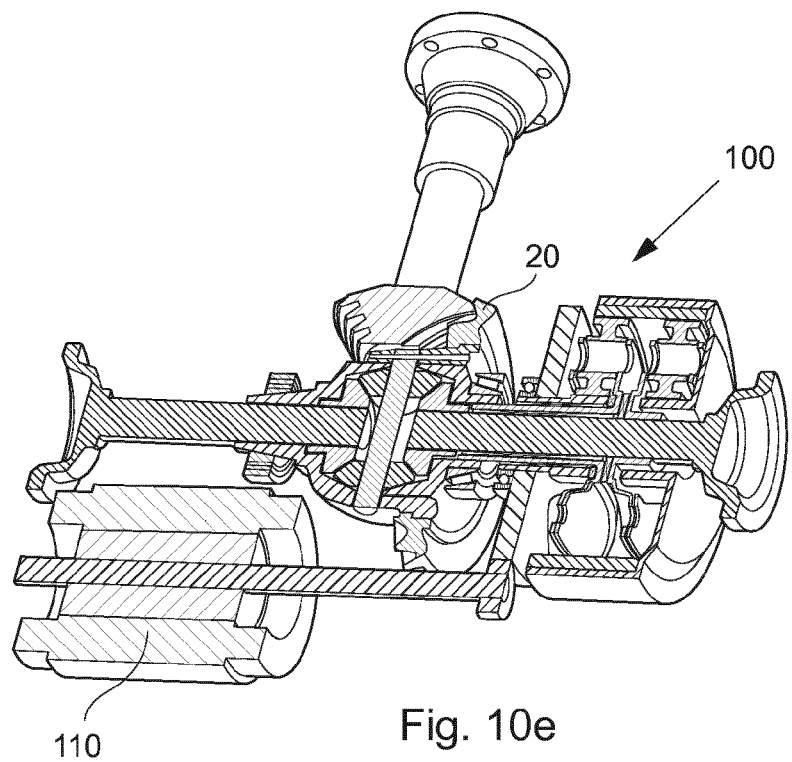
Figure 10F:
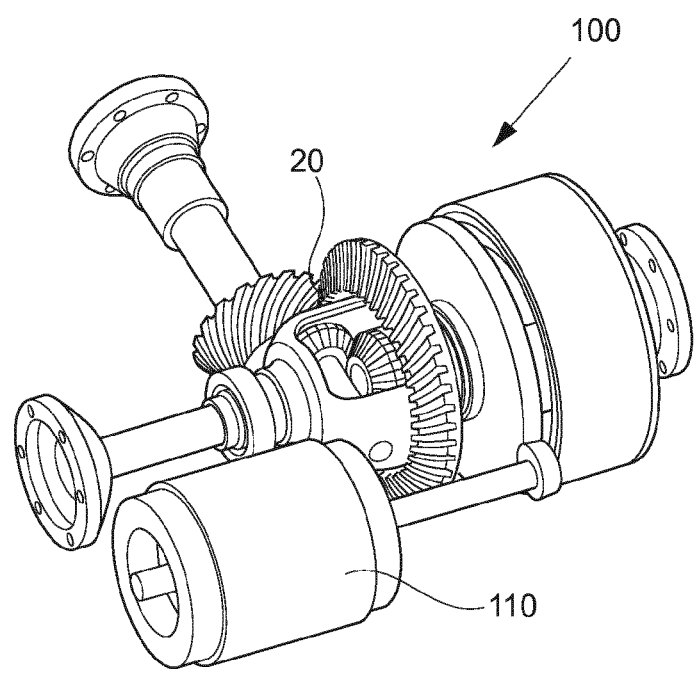

FIGS. 10a-f show a specific embodiment of the torque vectoring device 100 shown in FIGS. 9a-c for which change between hybrid mode and torque vectoring mode is achieved by an actuator 150 comprising an actuating sleeve 151, connecting the electrical motor 110 with the transmission 120. The transmission 120 comprises a first reduction gear, and two planetary gears 140a, 140b. Starting with FIG. 10a, torque vectoring mode is shown. For this the actuator 150 connects the ring wheel of the first and second planetary gears 140a, 140b. Neutral mode, shown in FIG. 10b, is achieved by disconnecting the ring wheels from each other. Hybrid drive mode is achieved by braking the ring wheel of the first planetary gear such that input torque is provided to the differential 20 via the planet carrier of the first planetary gear 140a. FIG. 10d shows an optional embodiment, in which the actuator 150 may connect the planet carrier of the first planetary gear 140a with the ring wheel of the first planetary gear. Such connection achieves a $2^{nd}$ gear hybrid drive mode.

Figure 11A:
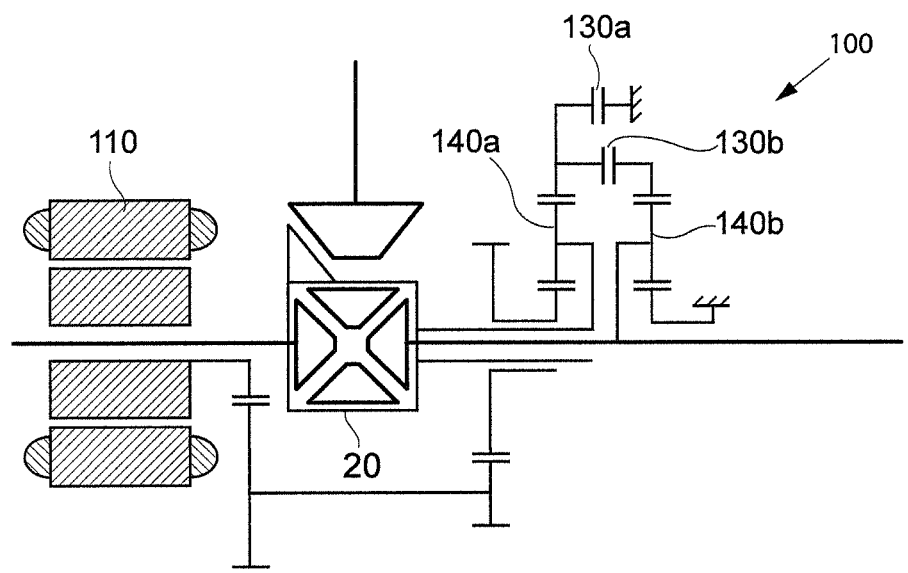
FIG. 11a is a schematic cross-sectional view of a torque vectoring device according to an embodiment.
Figure 11B:
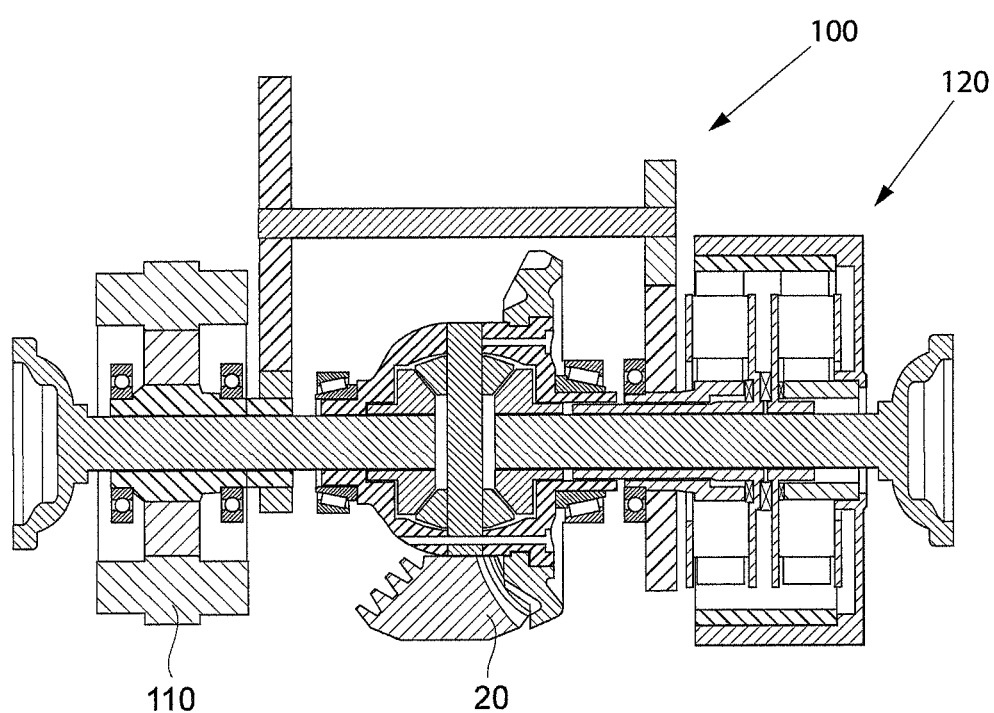
Figure 11C:
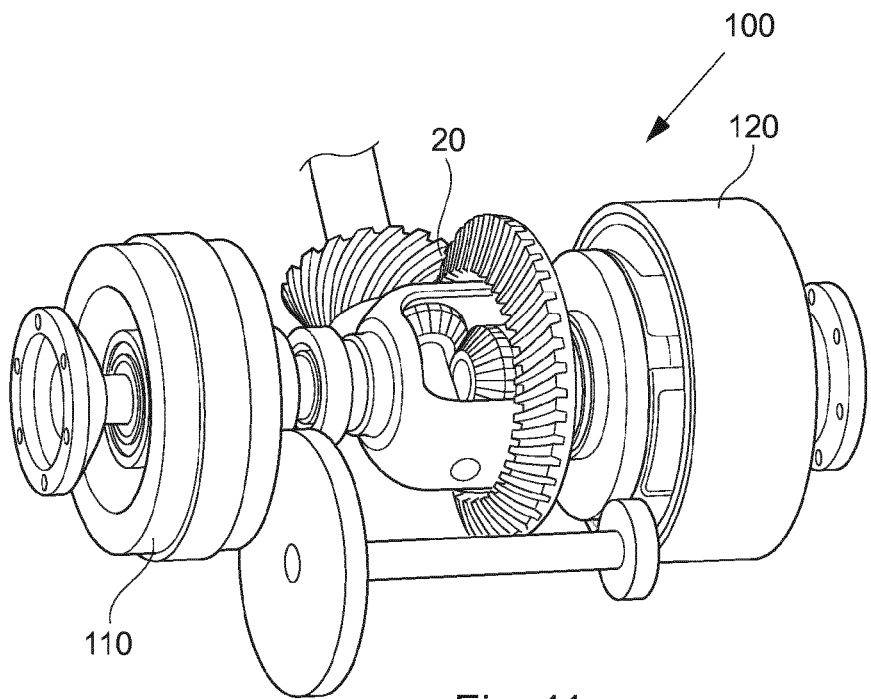

FIGS. 11a-c show a torque vectoring device 100 according to a further embodiment; being similar to the embodiment shown in FIG. 9, however the electrical motor 110 is arranged coaxially on the axle on one side of the differential 20 being opposite the side on which the transmission 120 is arranged. Further to this an additional reduction gear is provided between the electrical motor 110 and the first planetary gear set 140a, preferably providing a reduction in the range of 3-6:1.

Figure 12A:
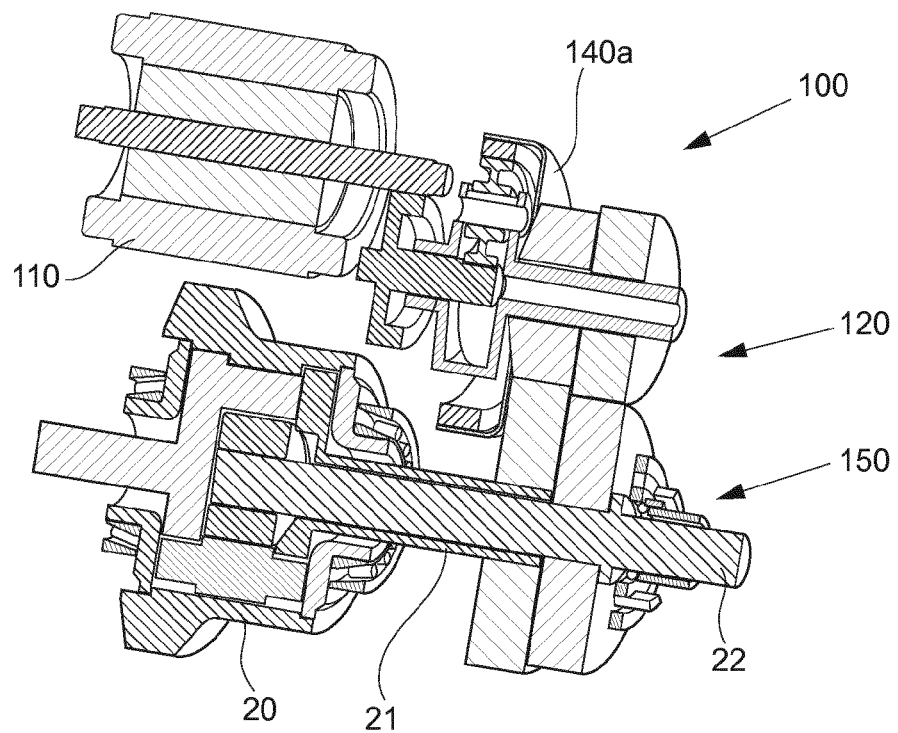
FIG. 12a is a cross-sectional view of a torque vectoring device according to an embodiment.
Figure 12B:
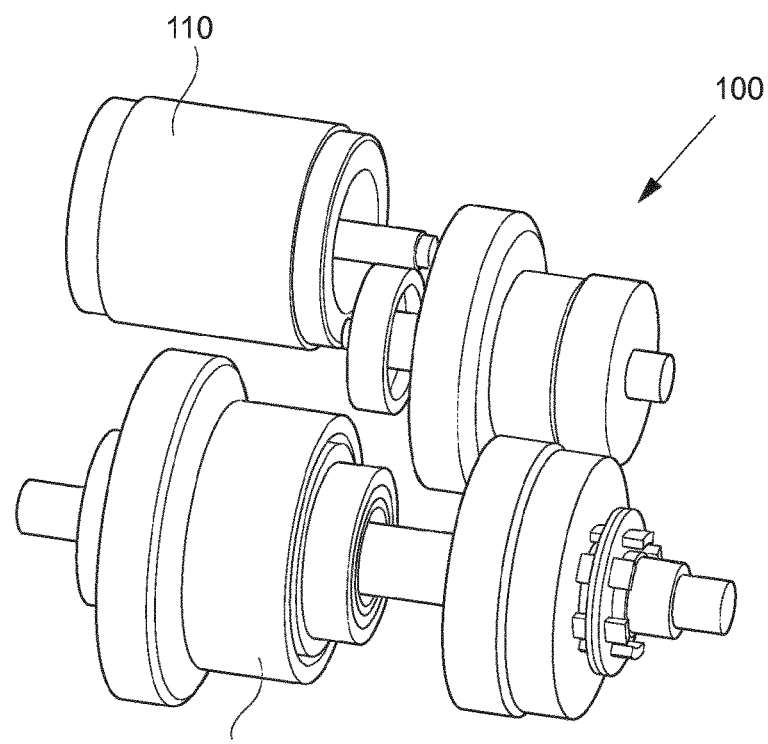

FIGS. 12a-b show a torque vectoring device 100 according to a further embodiment. In torque vectoring mode the electrical motor 110 connects with the differential 20 such that the electrical motor 110 stands still when an input shaft 21 of the differential rotates with the same speed as an output shaft 22 of the differential 20. The output shaft 22 is connected to a first driving half-axle (not shown) of the vehicle via for example a flange. The input shaft 21 of the differential forms a hollow shaft, through which the output shaft 22 extends.

The output shaft 22 is in engagement with either the planet carrier or the ring wheel of a planetary gear set 140a, while the input shaft 21 is in engagement with the other one of the planet carrier or the ring wheel of the planetary gear set 140a.

The input shaft 21 and/or the output shaft 22 may be connected to the planetary gear set via one or more gears. The electrical motor 110 is driving the sun gear of the planetary gear set 140a, preferably via a reduction gearing.

The different gear ratios of the planetary gearing 140a and the optional gears for connecting the input shaft 21 and the output shaft 22 to the planetary gear set 140a are so calculated that when the input shaft 21 and the output shaft 22 are rotating with the same speed, i.e. when the left and right wheels of the vehicle rotate with the same speed, the electric motor 110 does not operate or rotate. A rotational speed differential between the two wheels and thus between the shafts 21, 22 may then be counteracted by applying a torque by means of the electric motor 110. Alternatively, the electric motor 110 may be used for creating any desired rotational speed differential between the two wheels.

The embodiment of FIGS. 12a-b further comprises an actuator 150 which is configured to disconnect the output haft 22 from the transmission 120. Hence, when the torque vectoring device 100 is controlled to provide hybrid drive the actuator 150 is controlled to disconnect the output shaft 22 whereby the electrical motor 110 is driving the input shaft 21 only. Further details of this embodiment, when used in torque vectoring mode, is described in WO2012/082059.

Figure 13:
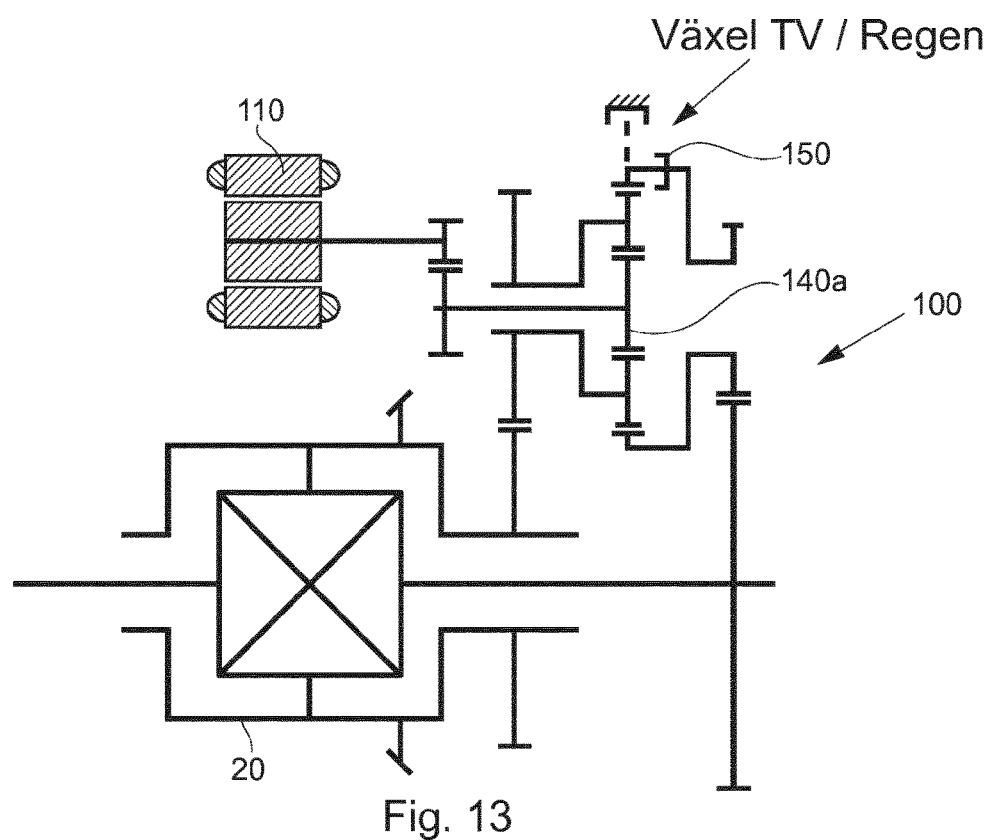
FIG. 13 is a schematic cross-sectional view of a torque vectoring device according to an embodiment.

FIG. 13 shows a further embodiment of a torque vectoring device 100. The electrical motor 110 is driving the sun gear of a first planetary gear set 140a, while the input shaft of the differential (the cage) is connected to the planet carrier. The output shaft of the differential is connected to the ring wheel. An actuator 150 is provided to control braking of the ring wheel and to connect or disconnect the ring wheel with the differential output shaft for torque vectoring or hybrid drive. Hence, the embodiment shown in FIG. 13 operates similarly to the embodiment shown in FIGS. 12a-b, although the actuator 150 is arranged at the planetary gear set instead of at the output shaft of the differential.

FIGS. 14a-e show a torque vectoring device 100 according to a specific embodiment based on the same principle as in FIGS. 12a-b. The electrical motor 110 is connected to the differential via a planetary gear set 140a. The input shaft of the differential 20 is connected with the ring gear, while the output shaft of the differential is connected to the planet carrier via a reduction gear. Consequently, the electrical motor 110 is driving the sun gear. An actuator 150 is provided for changing the mode of the device 100; simply be either braking the planet carrier or by connecting or disconnecting the planet carrier from the reduction gear.

Figure 14A:
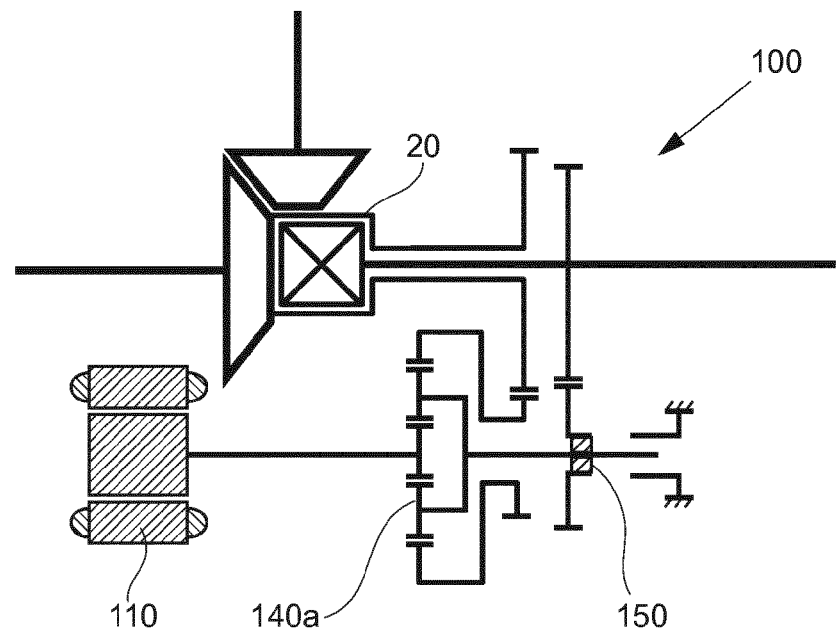
FIG. 14a is a schematic cross-sectional view of a torque vectoring device according to an embodiment when controlled to provide torque vectoring.
Figure 14B:
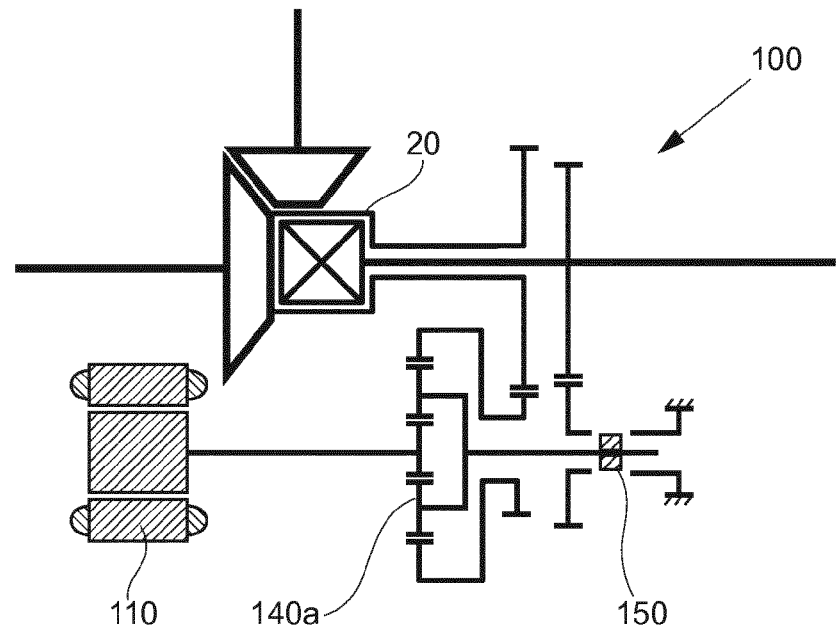
FIG. 14b is a schematic cross-sectional view of the device shown in FIG. 14a when controlled in a neutral or disconnected state.
Figure 14C:
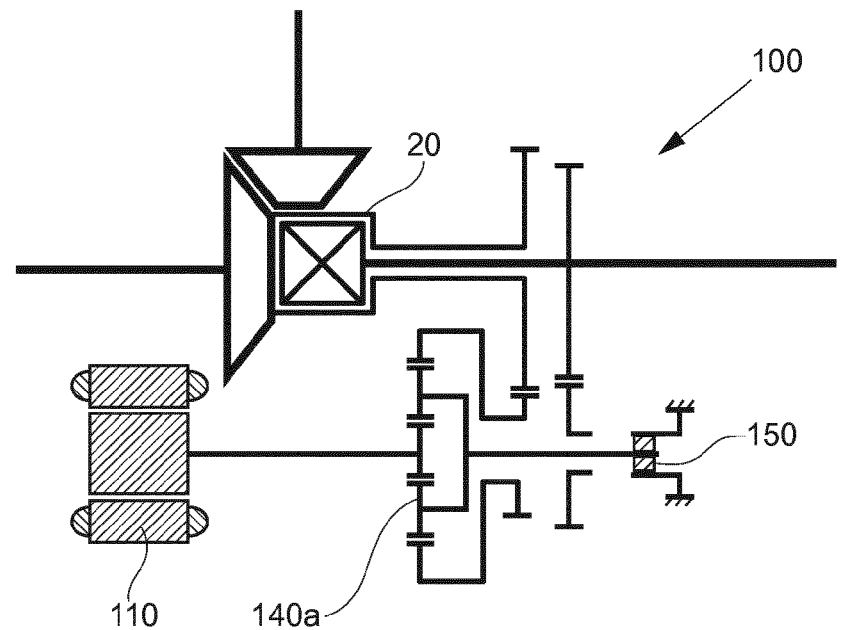
FIG. 14c is a schematic cross-sectional view of the device shown in FIG. 14a when controlled in a driving state.
Figure 14D:
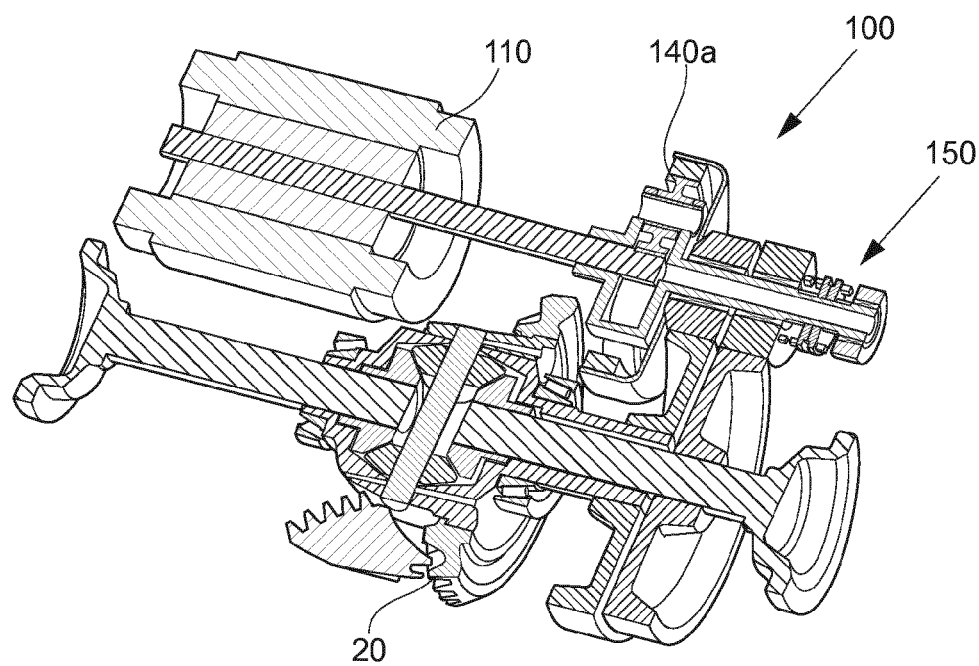
Figure 14E:
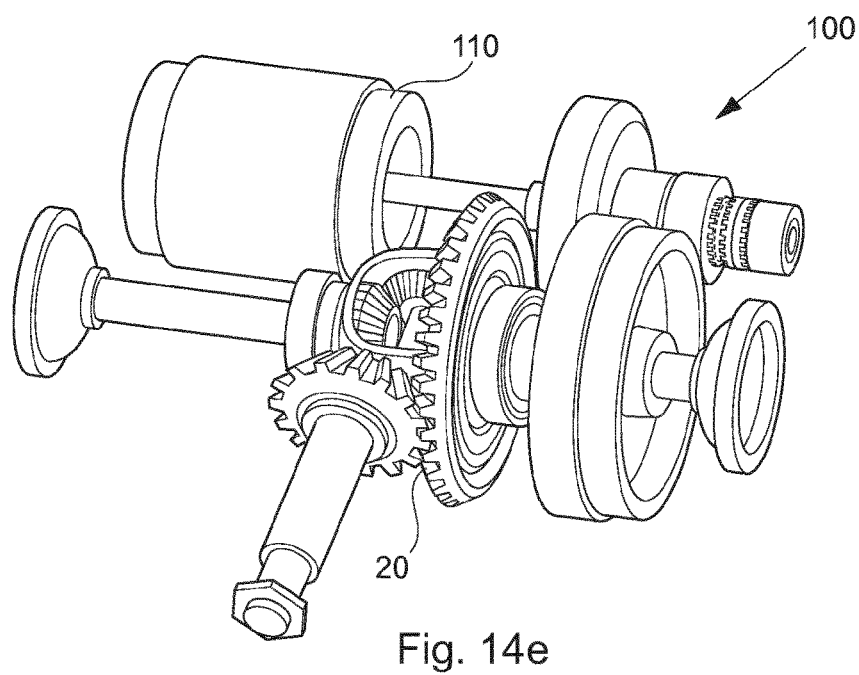

In FIG. 14a torque vectoring is achieved by connecting the planet carrier with the output shaft of the differential. In FIG. 14b neutral mode is achieved by disconnecting the planet carrier from the output shaft of the differential. In FIG. 14c hybrid drive is achieved by braking the planet carrier.

Figure 15:
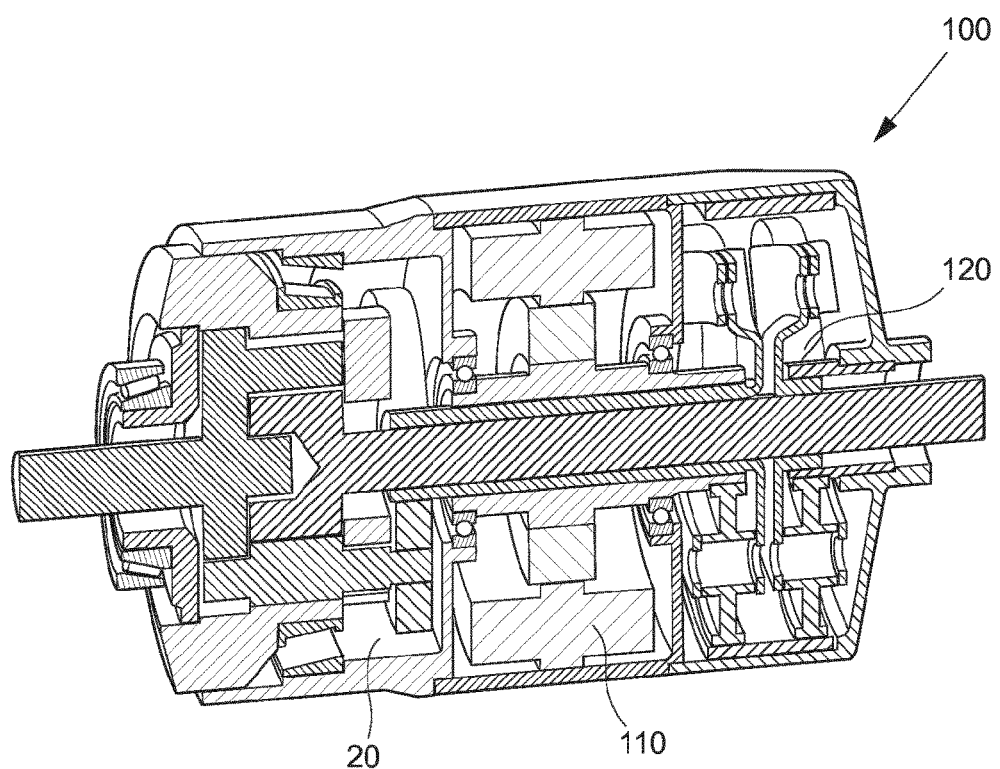
FIG. 15 is a cross-sectional view of a torque vectoring device according to an embodiment.

FIGS. 15 and 16 show embodiments of torque vectoring devices 100 for which the differential mechanism is achieved by one or more planetary gear sets. Hence, these embodiments may be particularly advantageous in cases where there is no mechanical input drive of the vehicle axle.

In FIG. 15 the differential mechanism is a planetary gear differential, whereby the electrical motor 110, when operated in torque vectoring mode, is connected to the two output shafts of the differential mechanism 20. The transmission 120 is similar to the transmission 120 of FIG. 1.

Figure 16A:
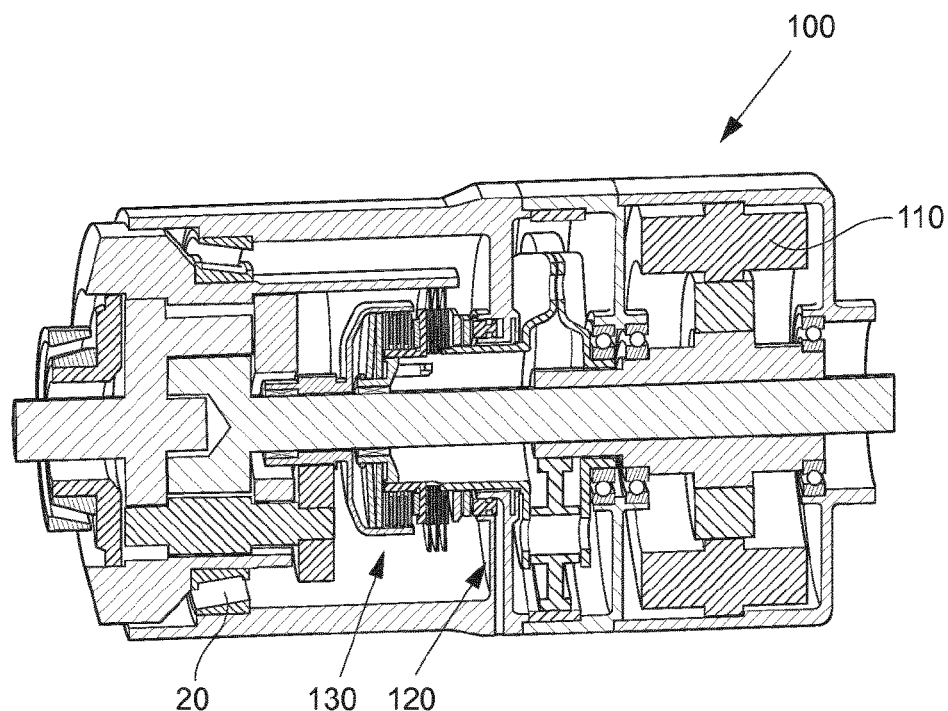
FIG. 16a is a cross-sectional view of a torque vectoring device according to an embodiment.
Figure 16B:
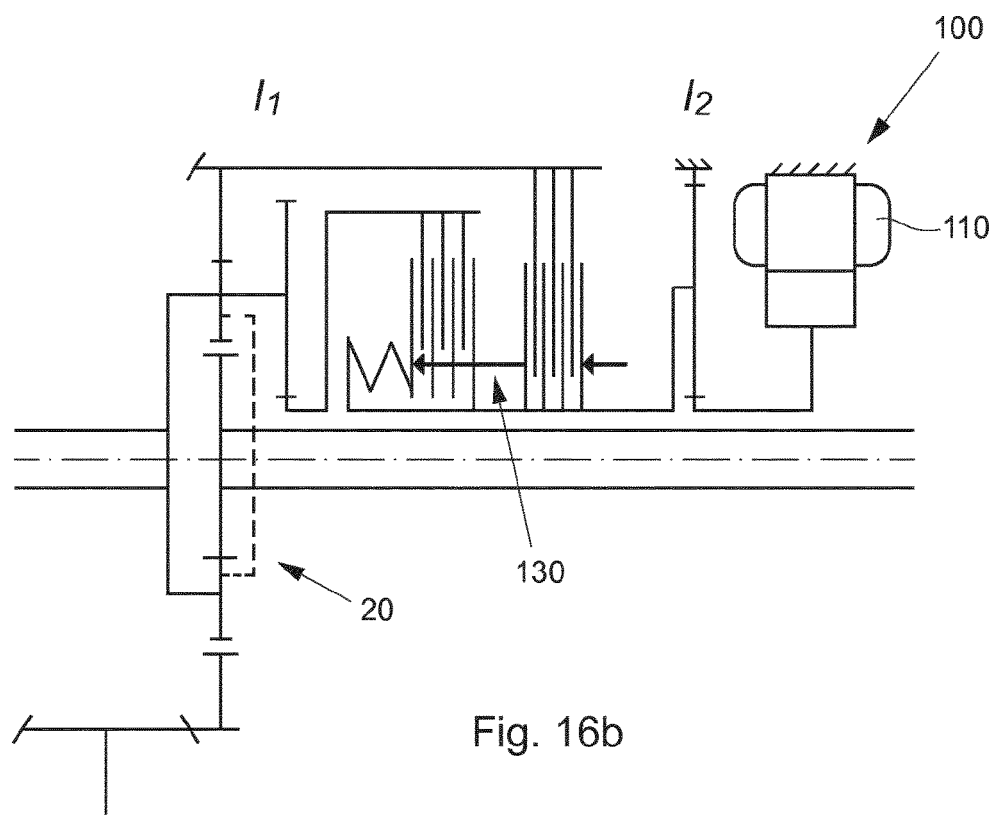

In FIGS. 16a-b a further embodiment of a torque vectoring device 100 is shown, in which the electrical motor 110 connects with a dual clutch package 130 based on the same principle as described in WO2006/068607. Actuation of the dual clutch package will determine the operation mode, i.e. hybrid drive or torque vectoring mode.

Figure 17:
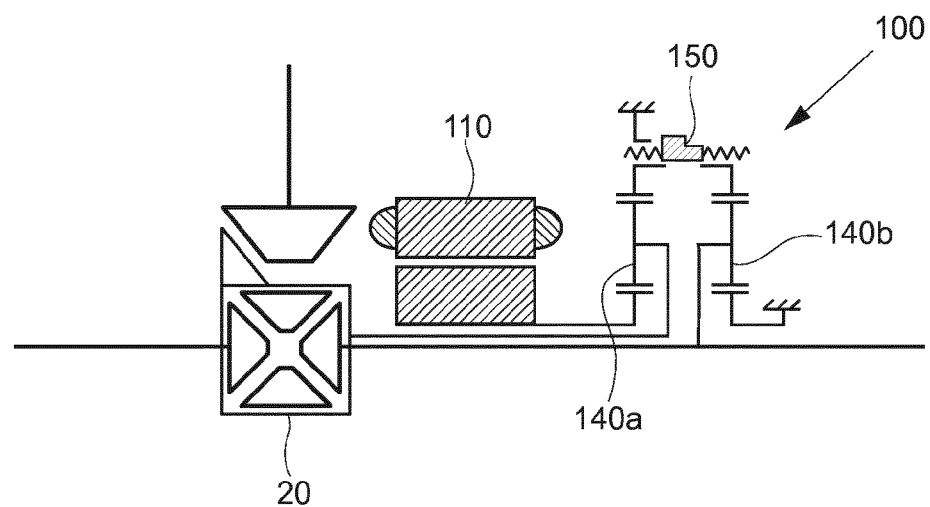
FIG. 17 is a cross-sectional view of a torque vectoring device according to an embodiment.

In FIG. 17 an embodiment of a torque vectoring device 100 is shown, similar to the embodiment shown in FIG. 1 but in which the two clutches 130a-b are replaced by an actuator 150 in the form of a splined shifting sleeve. Preferably the actuator 150 is controlled by means of a DC motor, or a reversible pump. The actuator 150, e.g. in the form of a dog clutch, is preferably designed such that it is biased towards a neutral position, and such that it may be disengaged from either torque vectoring mode or hybrid mode also when there is a torque from the electrical motor 110. This is advantageous in that in a dynamic event, such us ESP or ABS, the electrical motor 110 can be disconnected and thus protected from over speed. Also, in the case of failure mode resulting in too high torque from the electrical motor, disconnecting under torque can also be used for ensuring safety of the vehicle and the driver.

Figure 18:
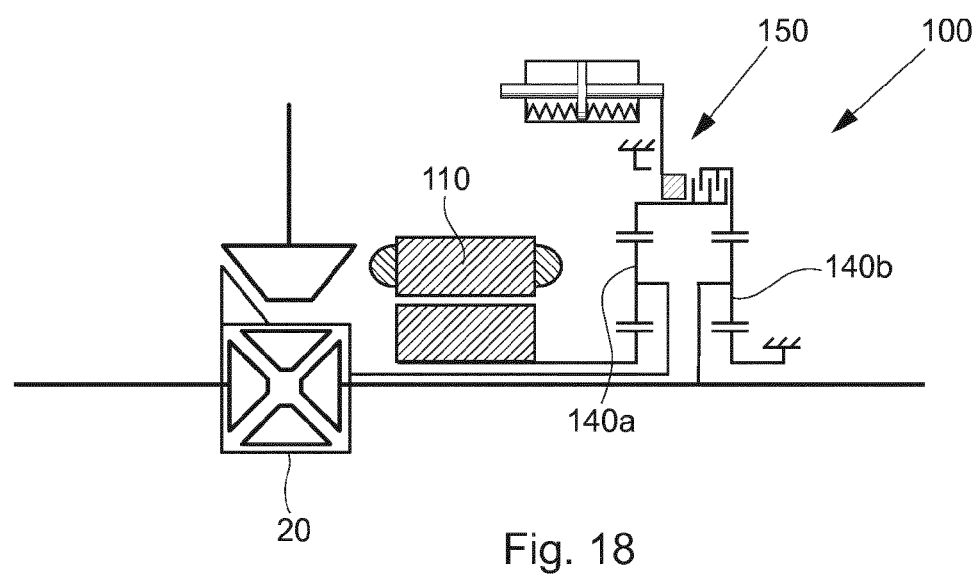
FIG. 18 is a cross-sectional view of a torque vectoring device according to an embodiment.

FIG. 18 shows another embodiment of an actuator 150 comprising a splined shifting sleeve, and a friction type clutch (e.g. using discs, cone, etc) for achieving torque vectoring. The splined shifting sleeve is preferably spring loaded to neutral position. The use of a clutch enables additional torque limit and monitoring function by clutch pressure control, since the torque during torque vectoring can never be higher than the applied pressure. Further to this the presented embodiment provides two separate control paths for simplified functional safety. The friction clutch also enables disconnect of the electrical motor in the event of over speed due to too high wheel differential speed, which may be the case during ESP or ABS. The actuator 150 may e.g. be actuated by a reversible pump.

Figure 19:
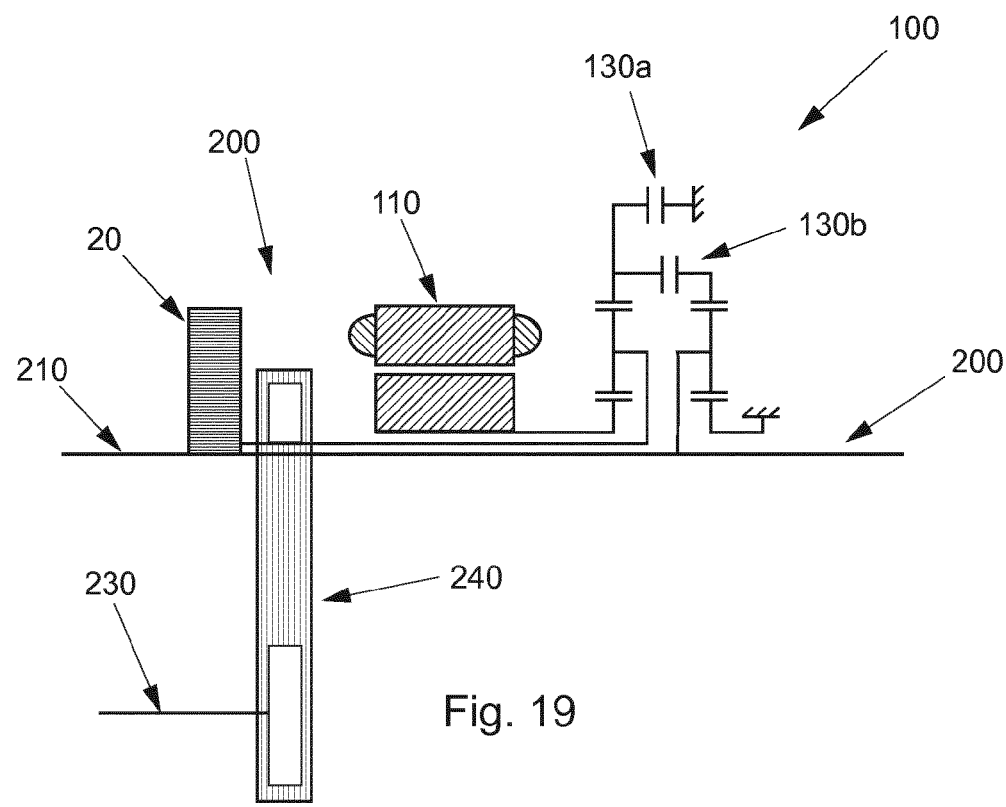
FIG. 19 is a schematic view of a transfer case comprising a torque vectoring device according to an embodiment.

FIG. 19 shows a transfer case 200 comprising a torque vectoring device 100. The transfer case has an input shaft 210 driving a differential mechanism 20. The differential mechanism 20 has a first output being the rear axle 220, and a second output being the front axle 230. The front axle 230 is non-coaxially arranged relative the rear axle 220, why a chain drive 240 is provided for transmitting rotation from the differential output to the front axle 230. The torque vectoring device 100 is similar to the torque vectoring device shown in FIG. 1; the torque vectoring device 100 is arranged on one output side of the differential mechanism 20 and comprises an electrical motor 110 and a transmission 120 for connecting the electrical motor 110 with the differential 20 in at least two different ways.

The torque vectoring device comprises two clutches 130a, 130b, and two planetary gear sets 140a, 140b. The electrical motor 110 drives the sun gear of the first planetary gear set 140a. When the first clutch 130a is actuated such that it brakes the ring gear of the first planetary gear set 140a, input torque from the electrical motor 110 is provided to the input shaft of the differential mechanism 20 via the planet carrier of the first planetary gear set 140a. Hence, the torque vectoring device 100 is providing a driving torque. Should the first clutch 130a open, while the second clutch 130b engages, torque from the electrical motor 110 will be added, or subtracted, from the already existing driving torque of the differential. Hence torque vectoring between front axle and rear axle is achieved. The clutches 130a, 130b may be any kind of suitable clutch known in the art, and the reduction (electrical motor to differential) may be in the range of 5:1.

In FIG. 19 it is shown that the torque vectoring device 100 of FIG. 1 may be used for a transfer case application, requiring only small modifications. It is realized that also the torque vectoring devices shown with respect to FIGS. 2-18 may also be modified in a similar manner for providing a torque vectoring functionality to a transfer case.

Figure 20:
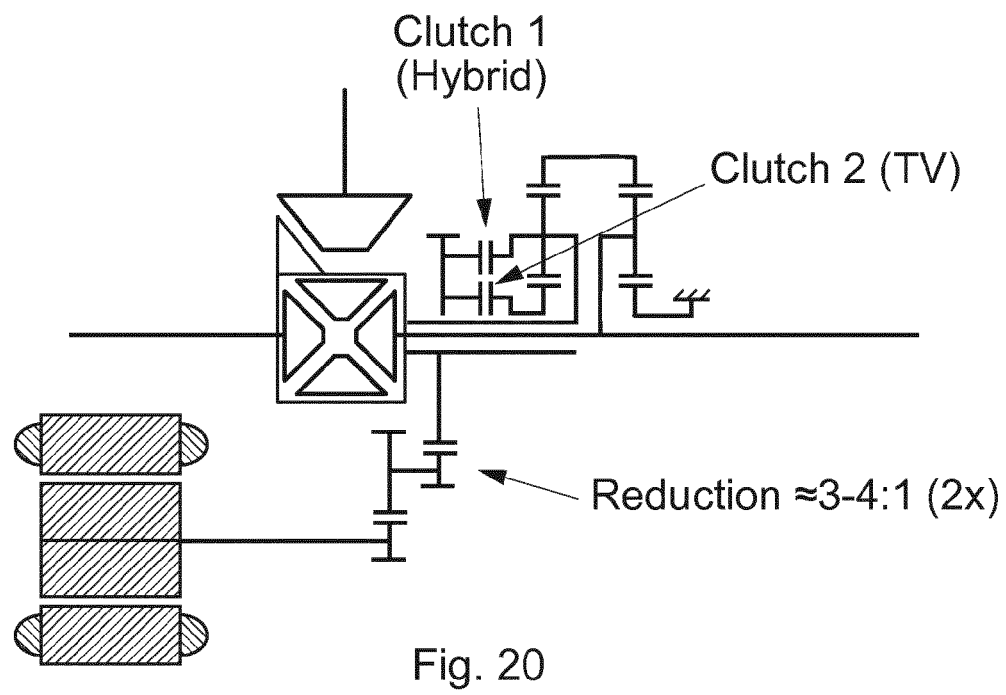
FIG. 20 is a schematic view of a torque vectoring device according to an embodiment.

In FIG. 20 a further embodiment of a torque vectoring device 100 is shown. The torque vectoring device 100 shows some similarities with the torque vectoring device shown in FIG. 9a. The torque vectoring device 100 is arranged on an axle 10 of a vehicle 1. The axle 10 comprises a differential mechanism 20. The torque vectoring device 100 is arranged on one side of the differential mechanism 20 and comprises an electrical motor 110 and a transmission 120 for connecting the electrical motor 110 with the differential 20 in at least two different ways.

The torque vectoring device comprises two clutches 130a, 130b, and two planetary gear sets 140a, 140b. The electrical motor 110 drives either the sun gear of the first planetary gear set 140a, or the planetary carrier of the first planetary gear set 140a. When the first clutch 130a is actuated such that the electrical motor 110 drives the planetary carrier of the first planetary gear set 140a, input torque from the electrical motor 110 is provided to the input shaft of the differential mechanism 20 via the planet carrier of the first planetary gear set 140a. Hence, the torque vectoring device 100 drives the axle 10 in hybrid mode. Should the first clutch 130a open, while the second clutch 130b engages, torque from the electrical motor 110 will be added, or subtracted, from the already existing driving torque on the right side of the differential via the planet carrier of the second planetary gear set 140b. In such way torque will at the same time be added or subtracted at the left side via the differential mechanism 20. Hence torque vectoring is achieved. If the first and second clutches 130a, 130b are left open, i.e. disconnected, neutral is achieved. The clutches 130a, 130b may be any kind of suitable clutch known in the art.

A first reduction is provided between the electrical motor 110 and the differential 20, i.e. by means of the second planetary gear set 140b. The reduction is e.g. in the range of 4:1. An additional reduction is arranged between the electrical motor 110 and the first planetary gear 140a. The reduction is a two-step reduction, and each step may be e.g. in the range of 3-4:1.

Figure 21A:
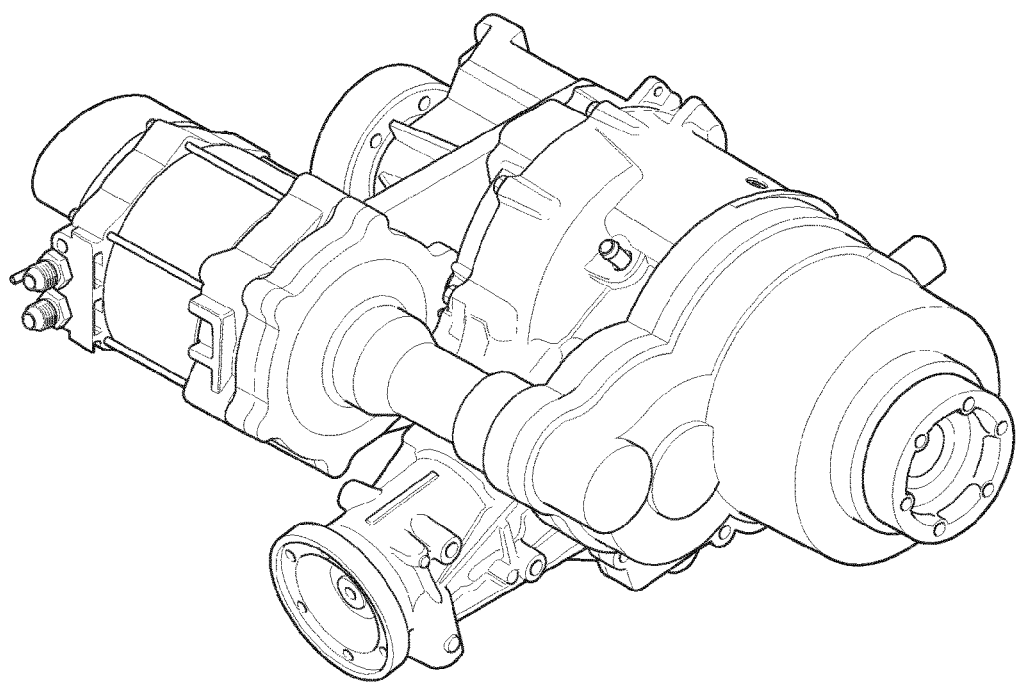
FIG. 21a is an isometric view of the torque vectoring device shown in FIG. 20.
Figure 21B:
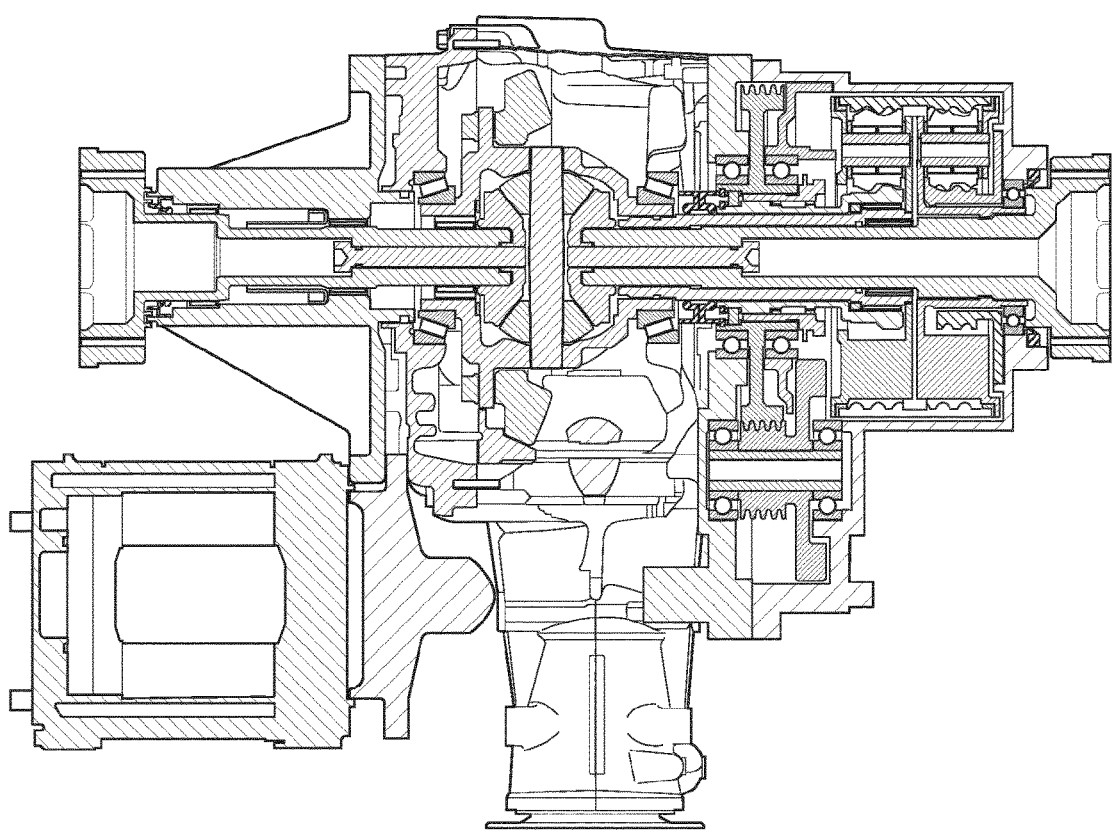

FIGS. 21a and 21b show the mechanical construction of the torque vectoring device 100.

In a yet further embodiment of a transfer case 200 the two clutches 130a, 130b may be one way clutches, such as freewheel clutches. The torque vectoring device 100 may in such embodiment operate in a mode wherein the electric motor is providing a driving torque. In such mode torque vectoring will be achieved, whereby an increased torque is transmitted to the rear output axle 220. Should the electric motor be controlled to provide a braking torque, hybrid drive is provided in the sense of regeneration.

Figure 22:
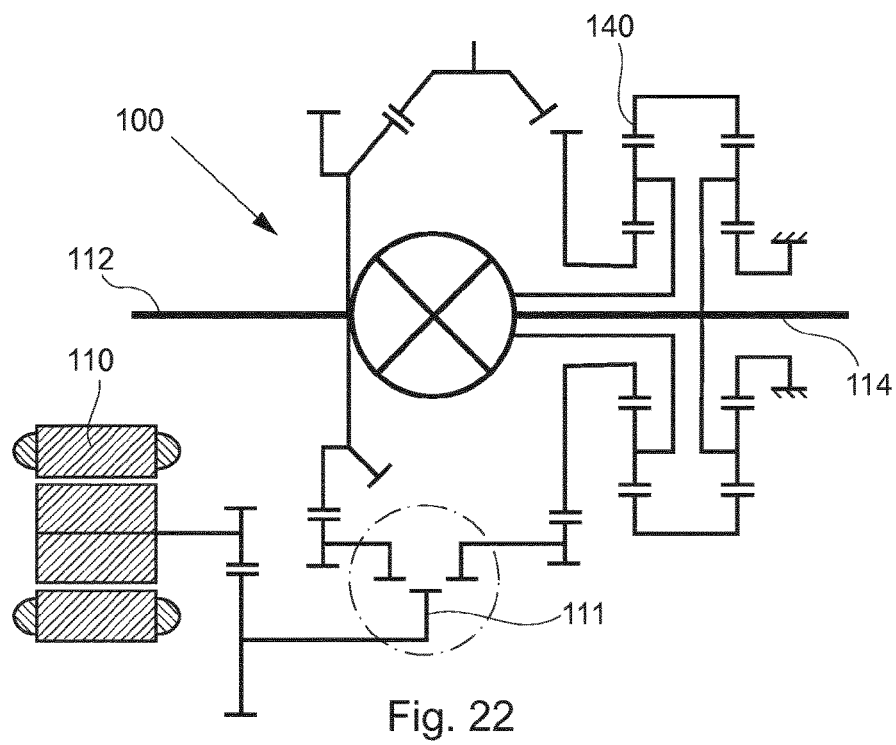
FIG. 22 is a schematic view of a transmission layout according to one embodiment.

FIG. 22 shows a schematic transmission layout of a torque vectoring system 100 according to one embodiment comprising a motor 110 and a dog clutch 111 shown in neutral position. When the clutch 111 is in a first position (the left connection in the figure) the motor 110 drives a left shaft 112. When the clutch 111 is in a second position (the right connection in the figure) the motor 110 drives a planetary gear set 140 and thus a right output shaft 114. The left and right output shafts are rotated in opposite directions, and thus torque vectoring is achieved.

Figure 23:
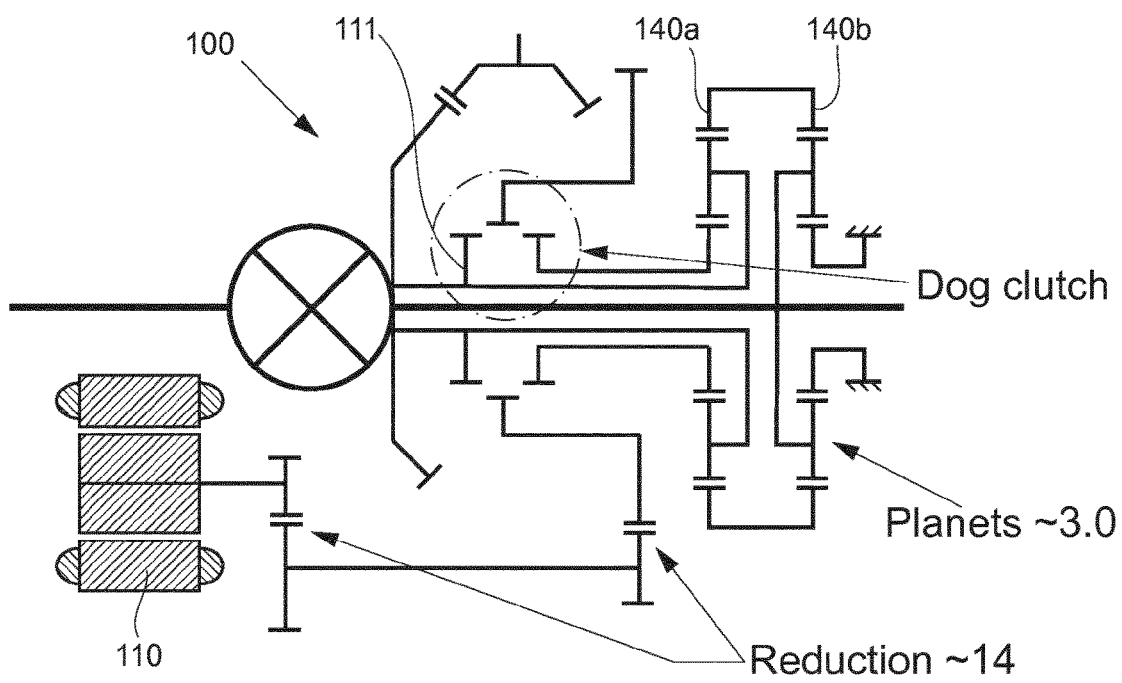
FIG. 23 is a schematic view of a transmission layout according to one embodiment.

In FIG. 23 a schematical transmission layout of a torque vectoring system 100 according to one embodiment is shown. The system 100 comprises a motor 110 and a dog clutch 111 shown in neutral position. The motor drives a first set of planetary gears 140a and when the clutch 111 is in a first position (to the right in the figure) it connects with the planetary gear set 140a. When the clutch 111 is in a second position (the left connection in the figure) it is not connected to the planetary gear set 140 but to the differential.

Figure 24:
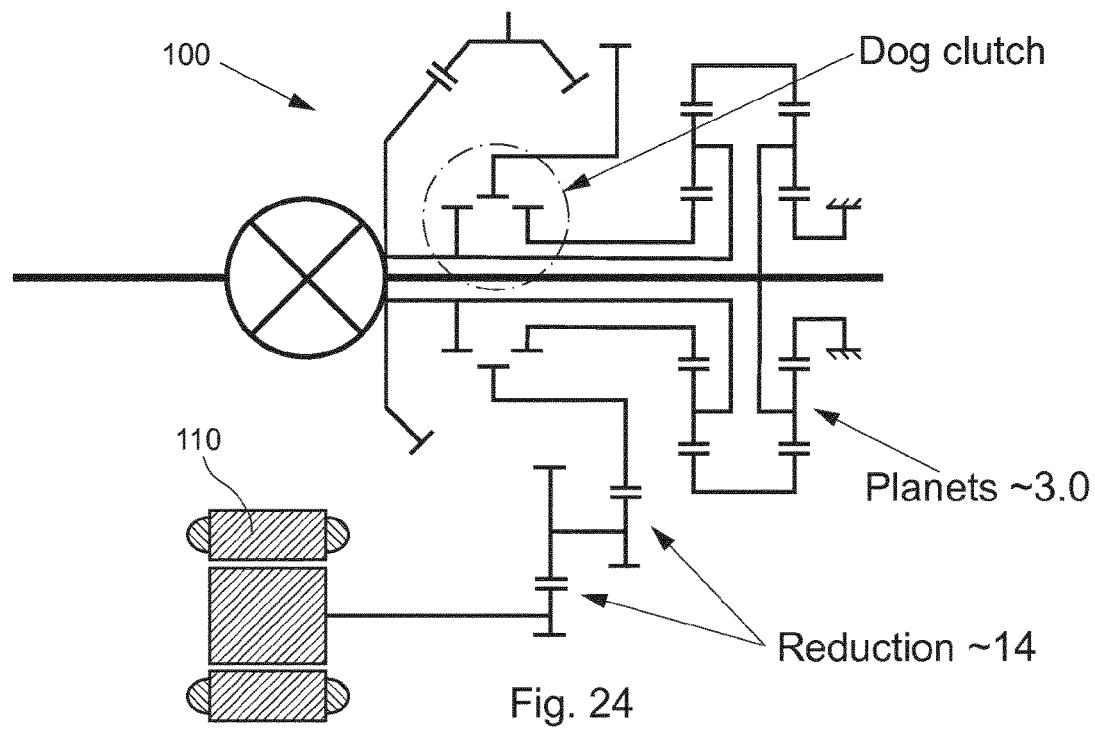
FIG. 24 is a schematic view of a transmission layout according to one embodiment.

The transmission shown in FIG. 24 has substantially the same layout as the one in FIG. 23, but the reduction gear for the motor is arranged in a different manner.

Figure 25:
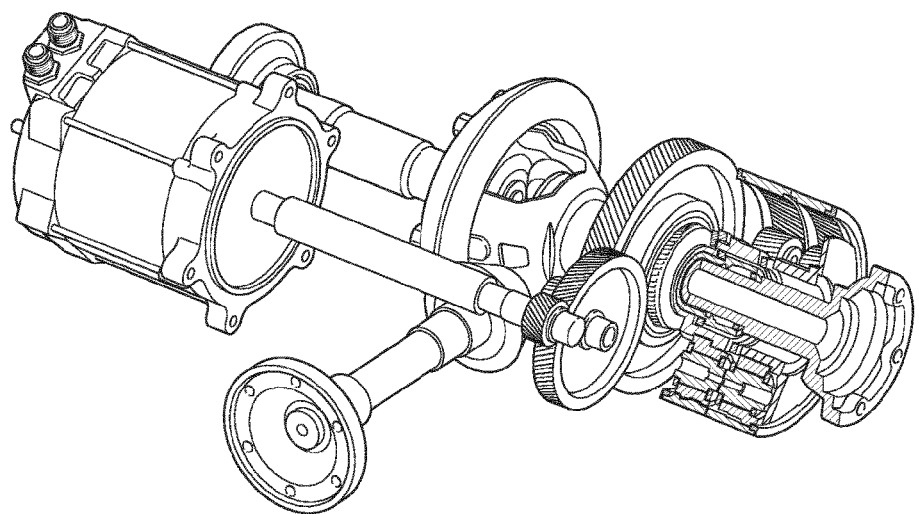
FIG. 25 is an isometric view of a transmission layout according to one embodiment.

In FIG. 25 the transmission of FIG. 24 is shown when implemented for a vehicle axle.

Figure 26:
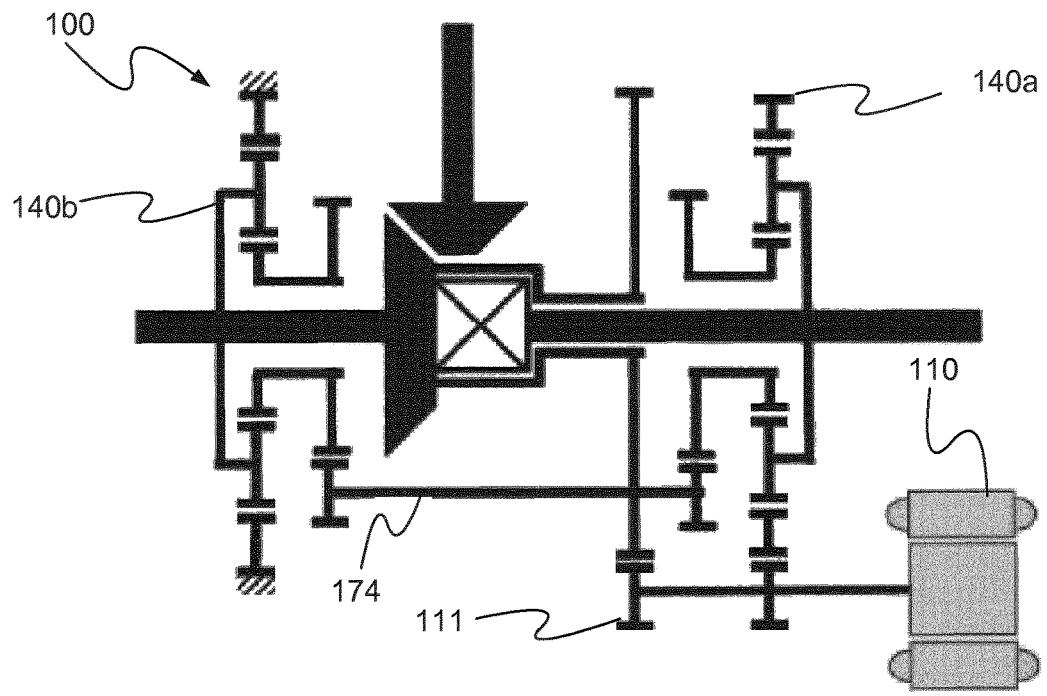
FIG. 26 is a schematic view of a transmission layout according to one embodiment.

In FIG. 26 another transmission layout 100 is shown. A motor 110 drives a first set of planetary gears 140a and a cage of a differential. By means of the first planetary gear set 140a a shaft 174 as well as an input shaft of the differential are driven. The shaft 174 in turn drives a second planetary gear set 140b which drives an output shaft of the differential. Thereby torque vectoring is achieved.

Figure 27:
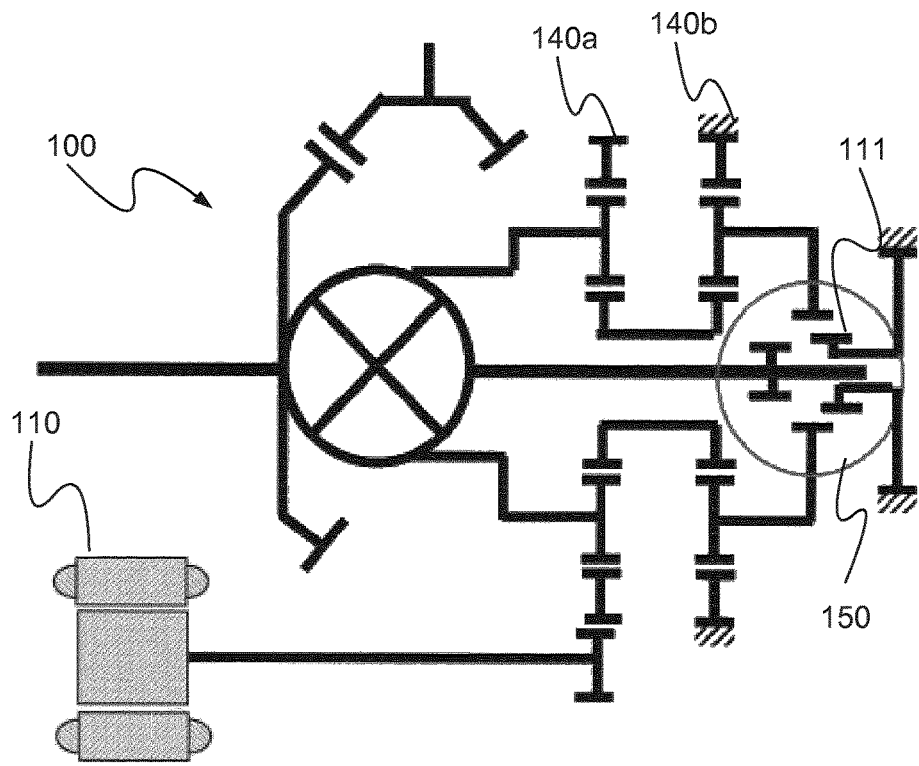
FIG. 27 is a schematic view of a transmission layout according to one embodiment.

The transmission layout 100 in FIG. 27 comprises a motor 110 which drives a ring wheel of a first planetary gear set 140a which drives a planet carrier, which in turn drives a cage of a differential, and, via a sun wheel, drives a second planetary gear set 140b. The second planetary gear set 140b is connected to a dog clutch 111. When this clutch 111 is in a first position (the right connection in the figure) it is unconnected. When the clutch 111 is in a second position (the left connection in the figure) it is connected to the second planetary gear set 140b.

Figure 28:
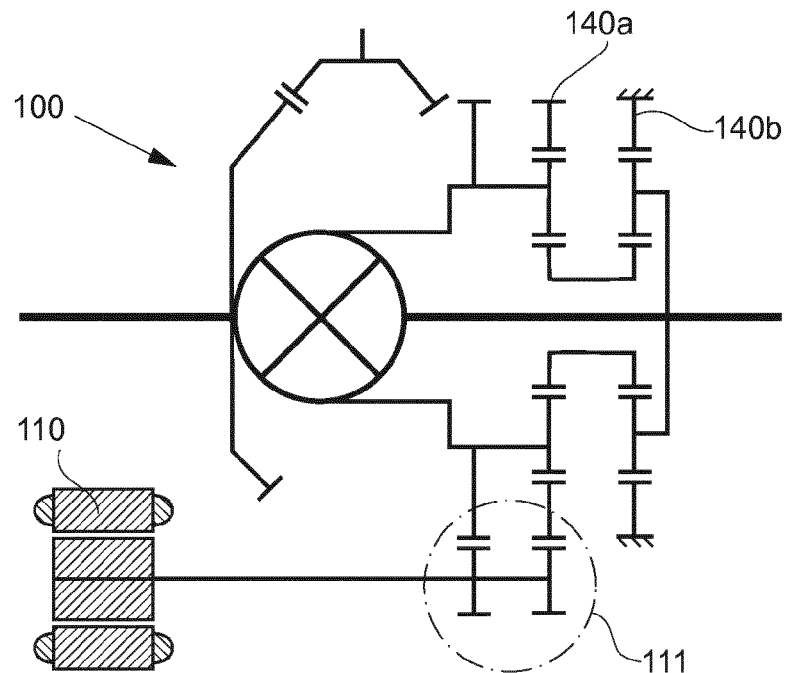
FIG. 28 is a schematic view of a transmission layout according to one embodiment.
Figure 29:
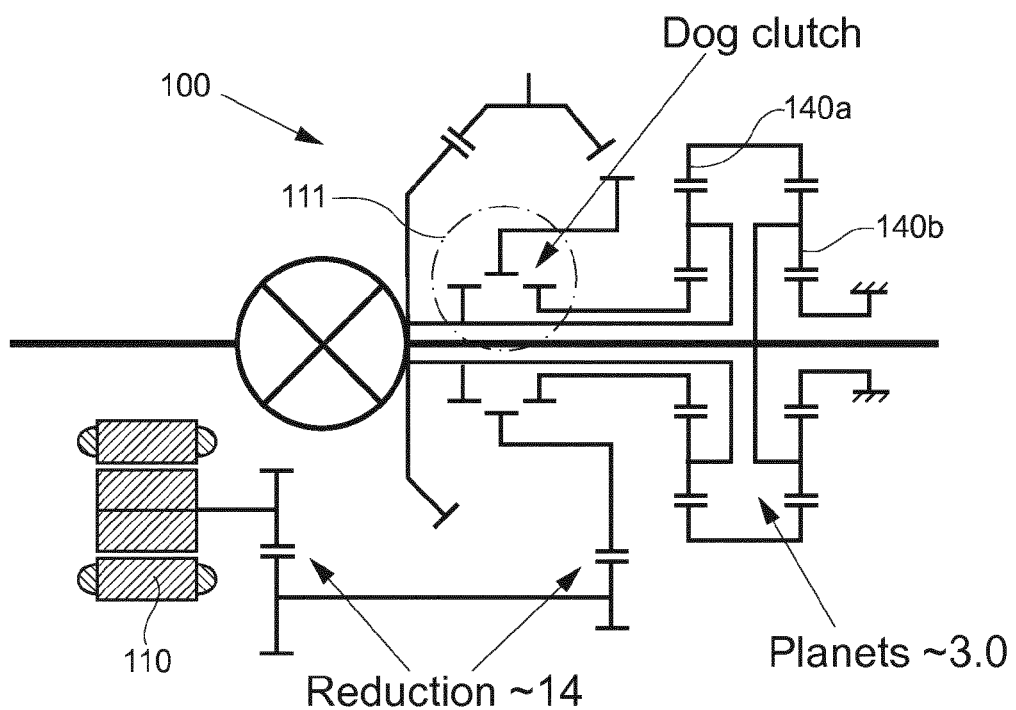
FIG. 29 is a schematic view of a transmission layout according to one embodiment.
Figure 30:
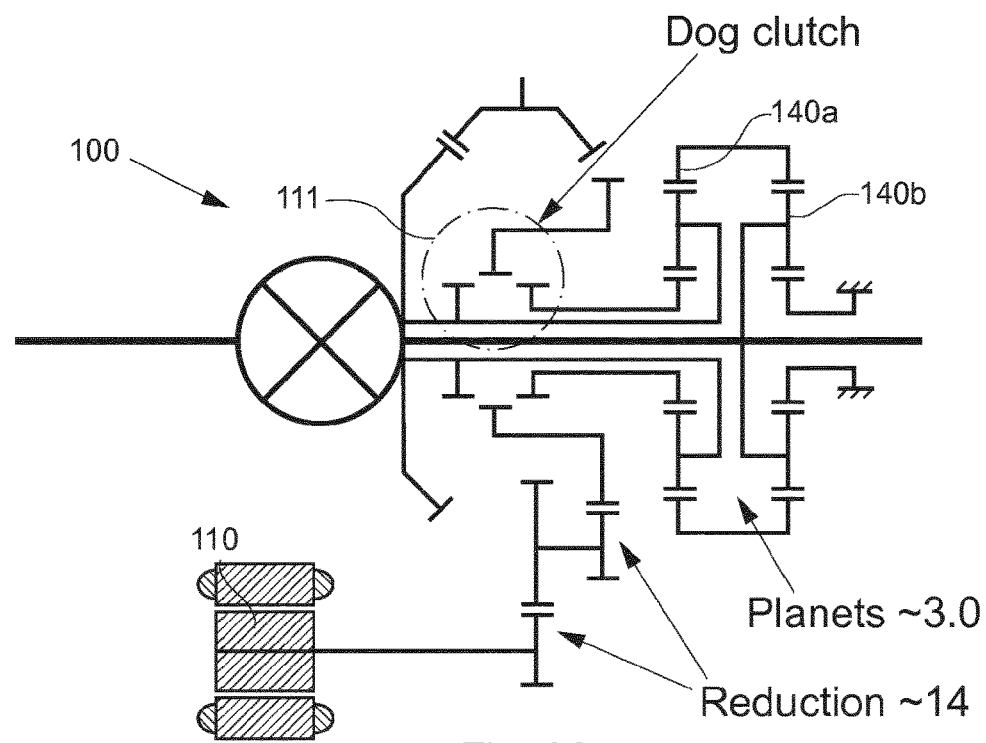
FIG. 30 is a schematic view of a transmission layout according to one embodiment.
Figure 31:
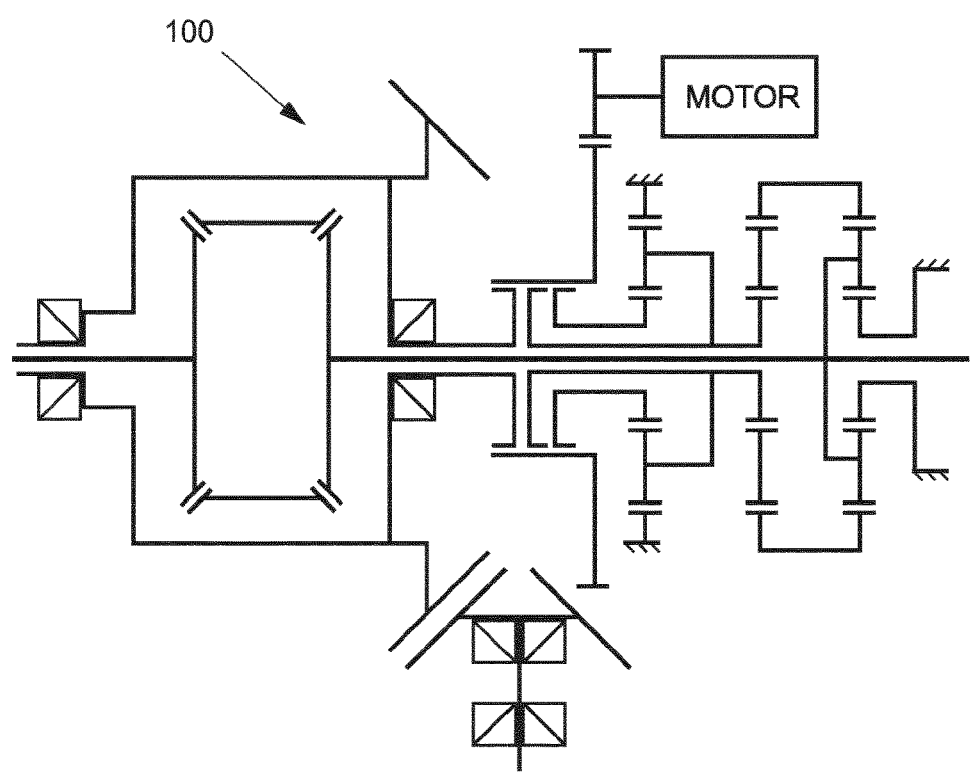
FIG. 31 is a schematic view of a transmission layout according to one embodiment.
Figure 32:
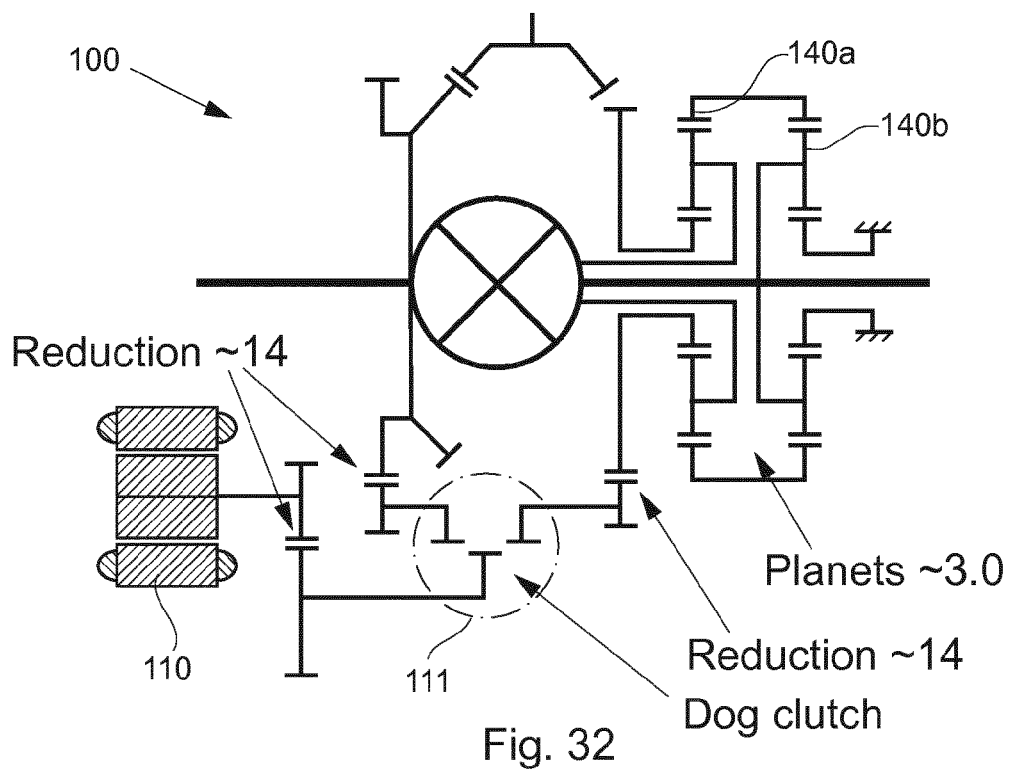
FIG. 32 is a schematic view of a transmission layout according to one embodiment.

Another transmission layout 100 is shown in FIG. 28. This transmission layout 100 comprises a motor 110, a first and a second planetary gear set 140a, 140b, a differential and a dog clutch 111. When the dog clutch 111 is in a first position (to the left in the figure) the motor 110 drives the first planetary gear set 140a as well as a cage of a differential. When the dog clutch 111 is in a second position (to the right in the figure) it is connected to the second planetary gear set 140b for providing torque vectoring.

In FIGS. 29, 30, 31 and 32 four embodiments of a first route of a torque vectoring system are shown. All embodiments comprises a motor 110, a dog clutch 111 and first and second planetary gear sets 140a, 140b. These systems are packaged in order to fit a selector. An advantage with this structure is that it is easy to produce and therefore suitable for serial production. In these embodiments the differential bearings would have increased loading due to offset to the side.

Figure 33:
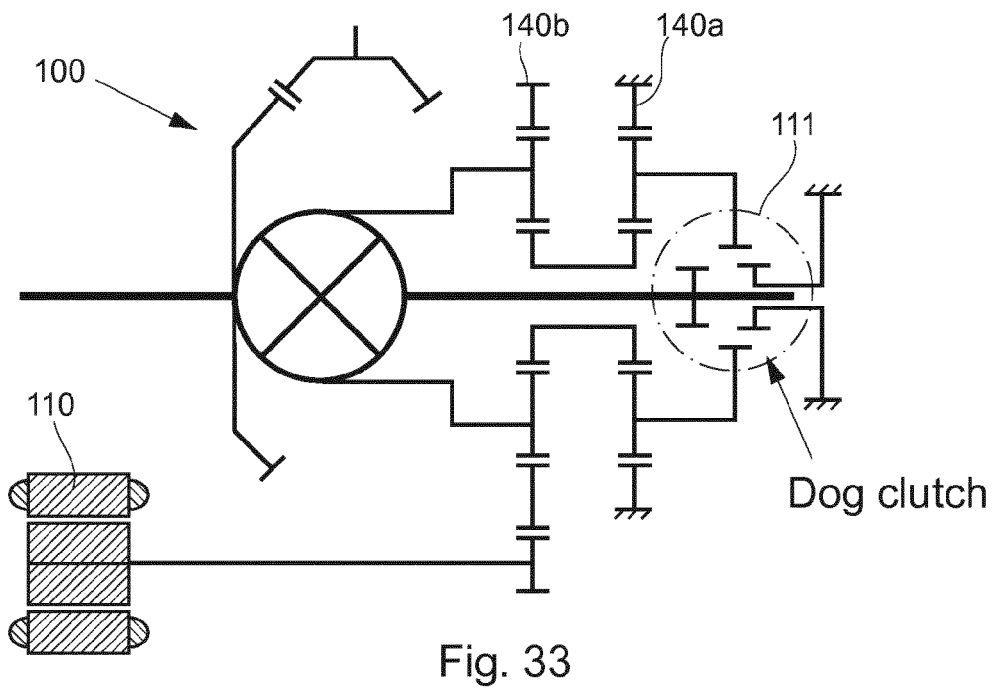
FIG. 33 is a schematic view of a transmission layout according to one embodiment.
Figure 34:
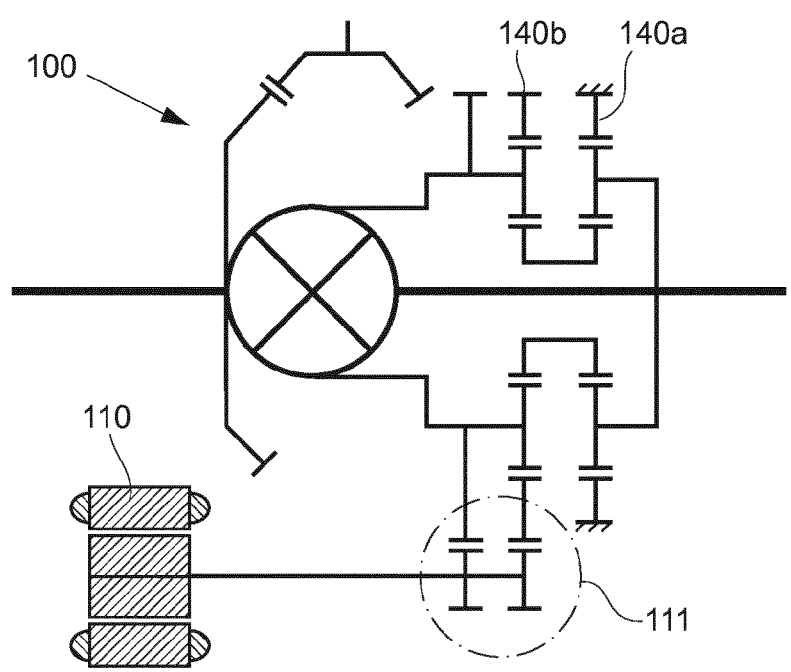
FIG. 34 is a schematic view of a transmission layout according to one embodiment.

The FIGS. 33-34 show two embodiments of a second route of a torque vectoring system 100 in which a motor 110 drives into an annulus rather than a sun of a first planetary gear set 140a. In this embodiment it is possible to change the planetary ratios. In FIG. 33 the dog clutch 111 drives a planetary on the first planetary gear set 140a which allows for a reduction of components due to the ratio from the planetary. In FIG. 34 the dog clutch 111 connects to the annulus instead.

Figure 35:
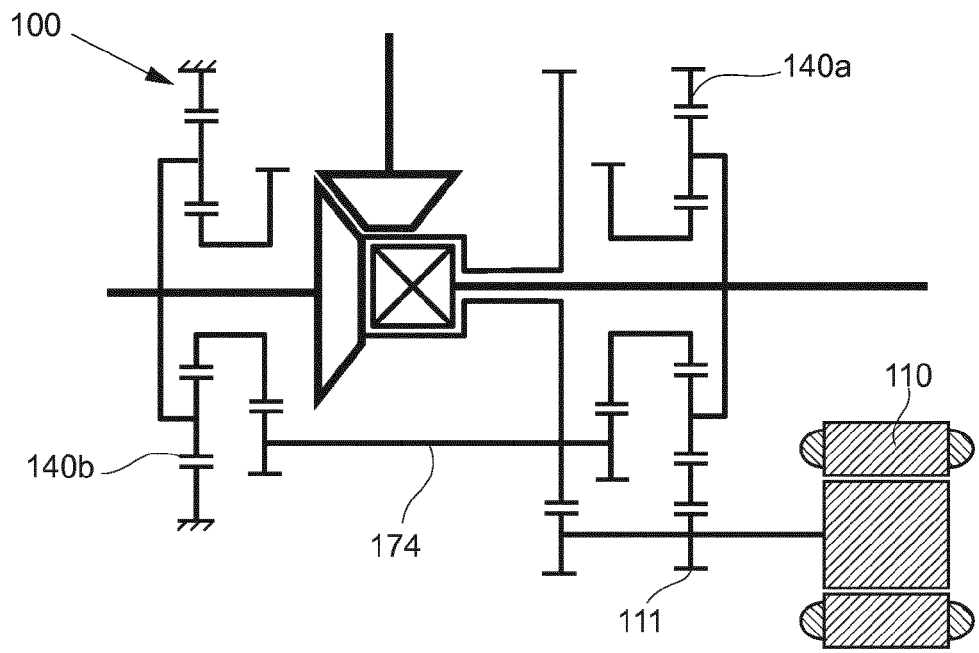
FIG. 35 is a schematic view of a transmission layout according to one embodiment.

In FIGS. 35 a split torque vectoring planetary system 100 with link drive 174, forming a balancing shaft between shafts, around the outside of the differential is shown. The two planetary gear sets 140a, 140b are thus connected using the shaft 174. The first planetary gear set 140a comprises a ring wheel with an outer gearing. The dog clutch 111 connects the motor shaft to either gear or none for neutral. This embodiment comprises split planetary torque vectoring. Since the planetary systems are connected by means of the shaft 174 the system is provided with improved load rating on the torque vectoring planetary systems due to halving of torque. This embodiment requires an understanding of how ratios between gears could reduce speed of the link shaft.

Figure 36:
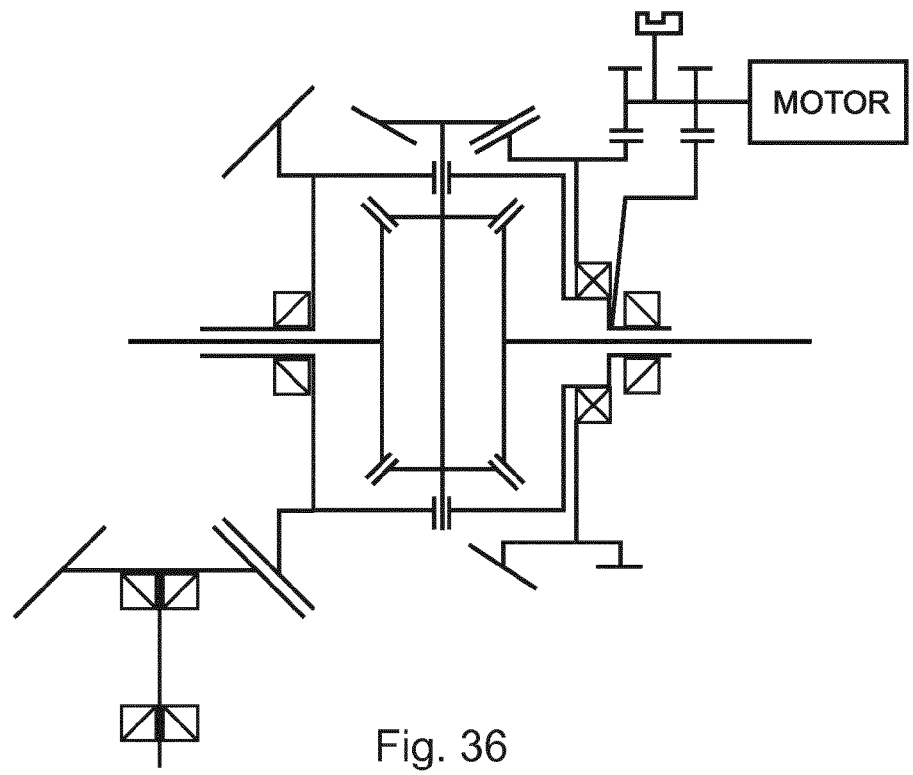
FIG. 36 is a schematic view of a transmission layout according to one embodiment.
Figure 37:
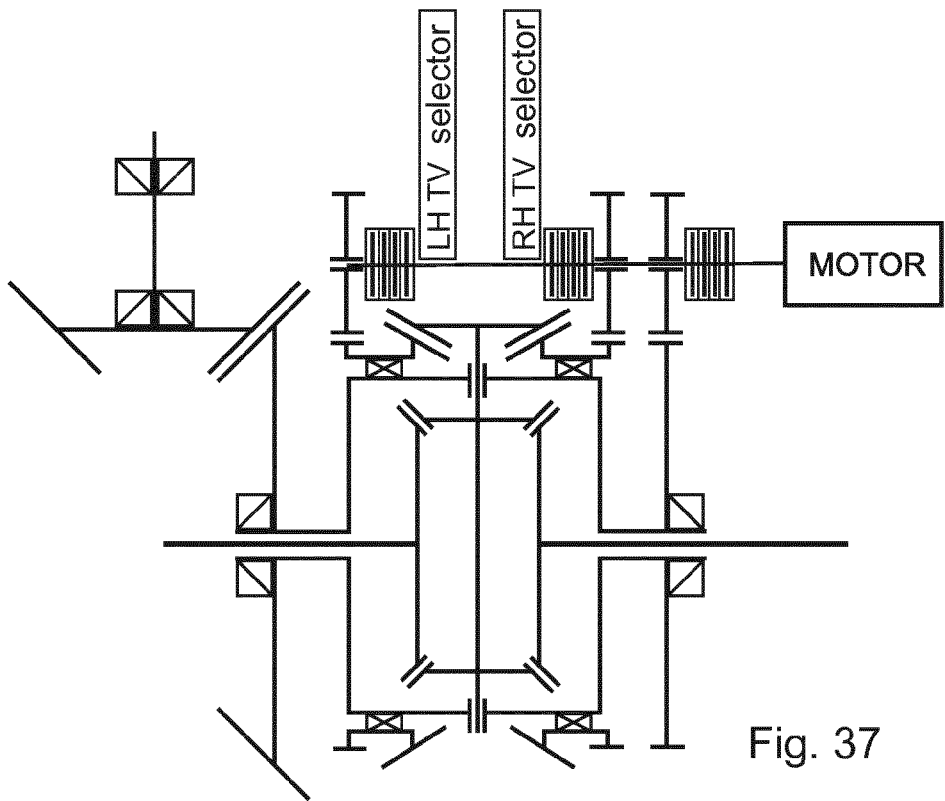
FIG. 37 is a schematic view of a transmission layout according to one embodiment.

In FIG. 36-37 a torque vectoring system which drives directly into differential bevel gears is shown. Torque vectoring is applied directly to the bevel gears inside the differential. The motor speed is linked to the wheel speed. This requires a large motor to still apply vectoring torque at high speeds. To use the same motor, functionality would be limited to lower speeds.

Figure 38:
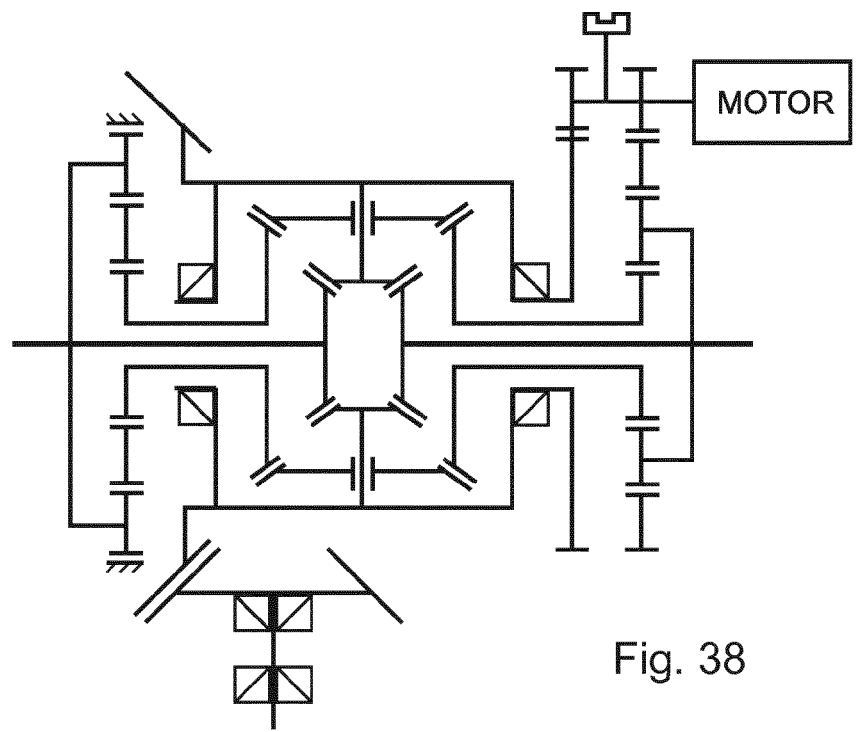
FIG. 38 is a schematic view of a transmission layout according to one embodiment.

In FIG. 38 a split torque vectoring system comprising link drive through second internal bevel set is shown. The torque vectoring planetary system is split to each side of the differential, while the suns are connected together through a second bevel set. This provides the system with improved axial package and improved loading on planets due to torque split. This however increases the number of parts and the complexity of the system. This system also requires an idler 302 on one side to correct direction changes across an outer bevel set.

Figure 39:
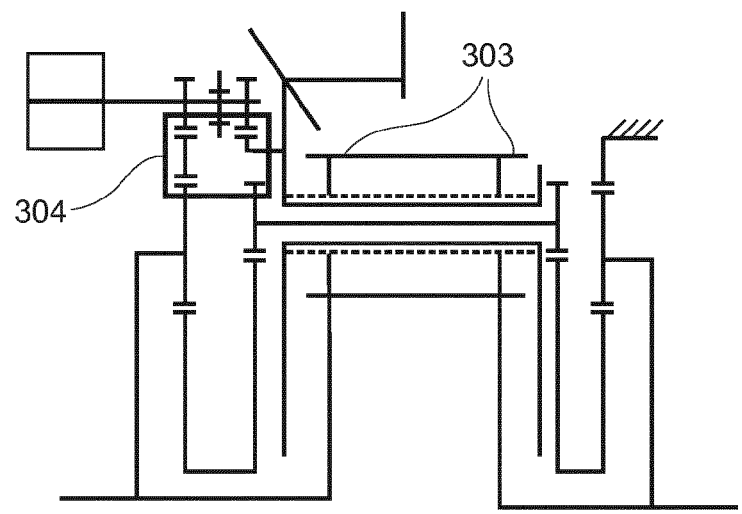
FIG. 39 is a schematic view of a transmission layout according to one embodiment.
Figure 40:
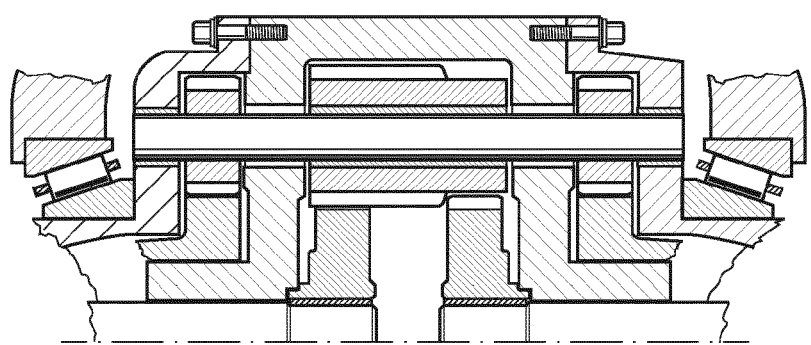
FIG. 40 is a schematic view of a transmission layout according to one embodiment.
Figure 41:
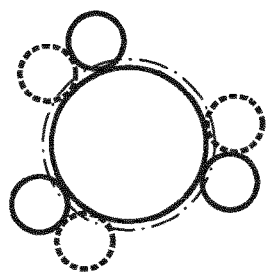
FIG. 41 is a schematic view of a transmission layout according to one embodiment.
Figure 42:
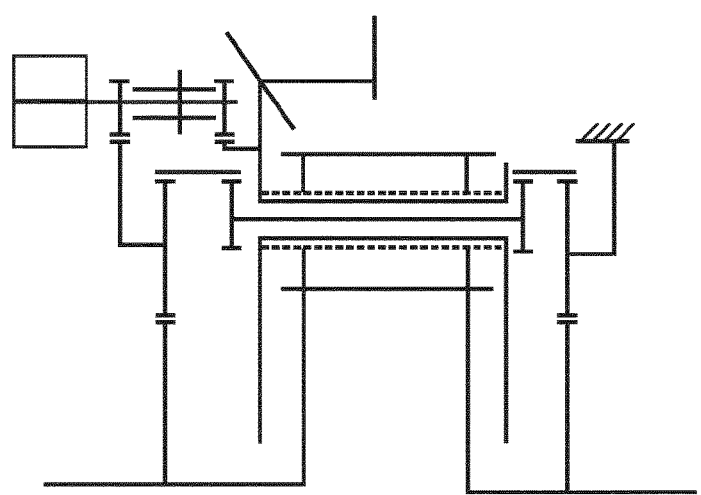
FIG. 42 is a schematic view of a transmission layout according to one embodiment.
Figure 43:
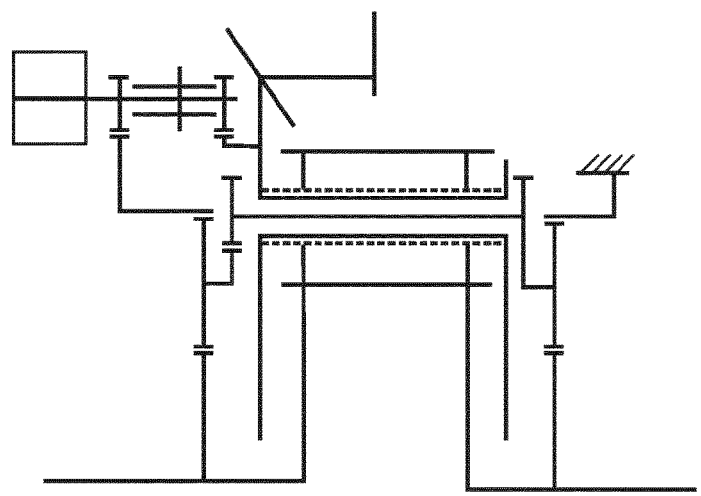
FIG. 43 is a schematic view of a transmission layout according to one embodiment.

In FIG. 39-43 a split torque vectoring planetary system with a link drive through the middle of the planetary differential is shown. In this embodiment a planetary differential is used. In FIG. 39 the planet gears 303 on the same axle are shown for simplicity. A gear train 304 to motor is shown in FIG. 39. In one embodiment this gear train 304 is a planetary gear train.

In this system the torque vectoring planetary system is split to each side of the differential, while connecting a common component using link shafts through the differential planet carrier. This requires use of the planetary differential. An advantage with this embodiment is that it provides the system with a good axial package.

Figure 44:
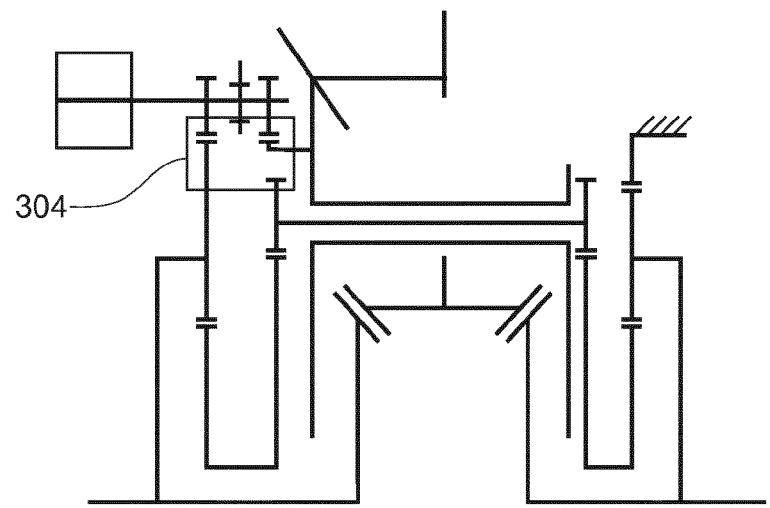
FIG. 44 is a schematic view of a transmission layout according to one embodiment.
Figure 45:
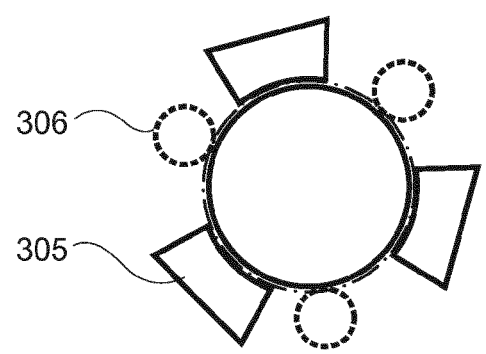
FIG. 45 is a schematic view of a transmission layout according to one embodiment.

In FIGS. 44-45 a split torque vectoring system with a link drive through the middle of a bevel differential is shown. In this embodiment the torque vectoring planetary system is split to each side of the differential, while connecting a common component using link shafts through the planet carrier. A gear train 304 is shown in FIG. 44. In one embodiment this gear train is planetary gear train 304. In FIG. 45 a bevel differential 305 nested with planets connecting sun gears 306 is shown. This system is similar to the ones described in connection with FIGS. 39-43, but it comprises a bevel differential in order to prevent planetary differential capacity concerns.

Figure 46:
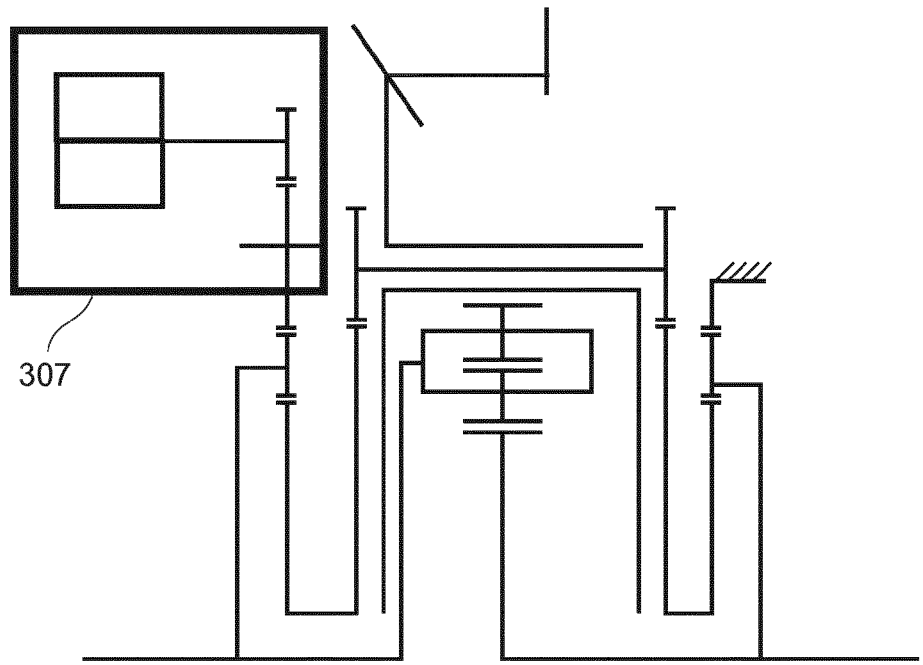
FIG. 46 is a schematic view of a transmission layout according to one embodiment.
Figure 47:
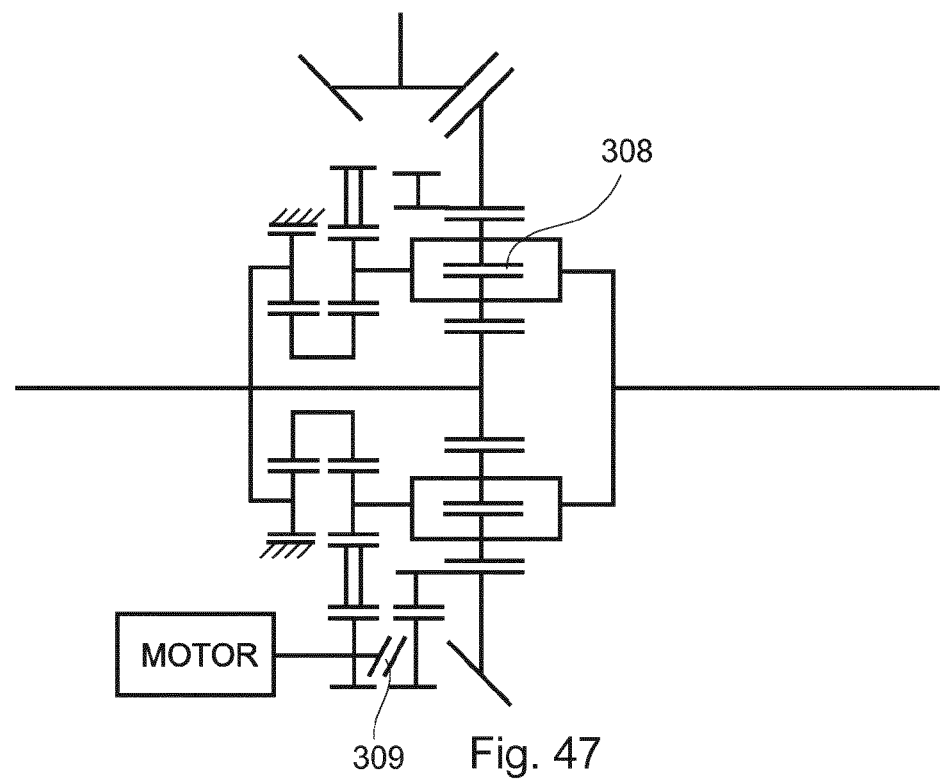
FIG. 47 is a schematic view of a transmission layout according to one embodiment.

In FIGS. 46-47 a system comprising a double planetary differential is shown. By the double planetary differential access is allowed to both drive shafts using the sun and planet carrier. To torque vectoring system applies the additional torque into each of these paths using a two stage epicyclical system. An advantage with this embodiment is an improved axial package. In FIG. 46 a gear train 307 to the motor is shown. In one embodiment the gear train is a planetary gear train 307. In FIG. 47 the double planet epicyclical differential 308 is shown, as well as a hybrid selector 309.

Figure 48:
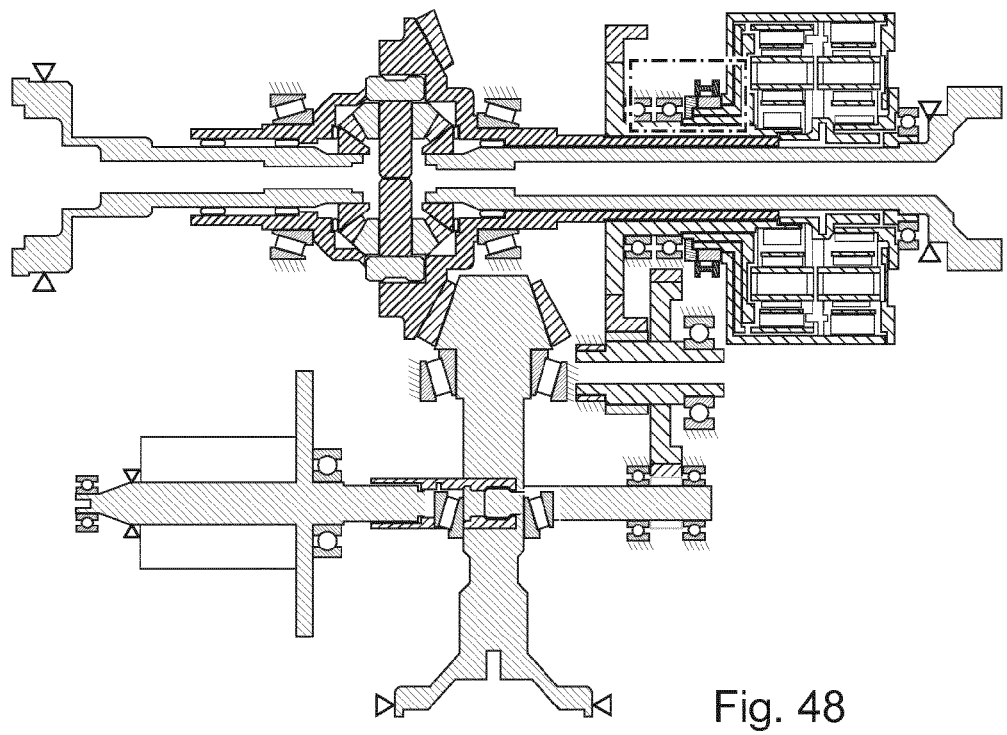
FIG. 48 is a schematic view of a transmission layout according to one embodiment.
Figure 49A:
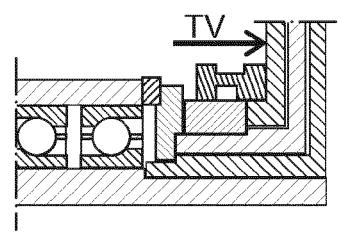
FIG. 49a is a schematic view of a dog clutch in a torque vectoring mode.
Figure 49B:
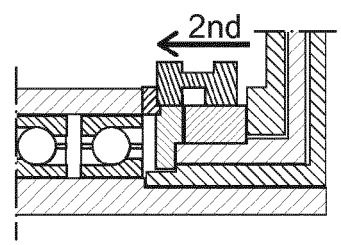
FIG. 49b is a schematic view of a dog clutch in a second speed mode.
Figure 49C:
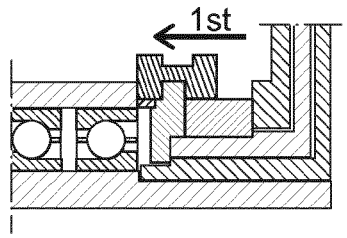
FIG. 49c is a schematic view of a dog clutch in a first speed mode.

In FIG. 48 a two speed concept is shown. In FIG. 49a-49c different positions of the dog clutch is shown. In FIG. 49a the dog clutch is in torque vectoring mode, in FIG. 49b the dog clutch is in a second speed mode, and in FIG. 49c it is in a first speed mode.

Another aspect of the invention is shown in FIGS. 50-51, implementing torque vectoring without the additional functionality of hybrid drive. FIG. 50 shows a transmission layout of a torque vectoring device 350. It comprises an electrical motor 360 and a ring wheel 361 comprising both inner and outer gears. The motor 360 drives the outer gear of the ring wheel 361, whereas the inner gear drives a planet carrier 373a of the first planetary gear set. The planet carrier 373a drives both a left output shaft 374a, as well as a planet carrier 373b of a second planetary gear set, driving a right output shaft 374b.

FIG. 51 shows a transmission layout of a torque vectoring device 300. An electrical motor 310 drives an annulus or ring wheel 341 of a first planetary gear set 340a, which in turn drives a planet gear 342. The ring wheel 341 comprises an additional outer gearing. The planet gear 342 drives a right output shaft 343a of a differential 344. The planet 342 is also drives a shaft 345 which drives a second planetary gear set 340*b*, driving a second output shaft 343*b* in an opposite direction compared to the first output shaft 343*a*. Thus, torque vectoring is achieved.

For all embodiments described so far, some general concepts may be implemented in order to improve performance. Below, some of these common concepts will be described.

Cooling

In an embodiment, in order to remove excess heat from the electrical motor of the torque vectoring device air cooling is utilized. The air cooling may be realized by providing cooling flanges and/or fins to the exterior of the electrical motor. In this way, ambient air is used to remove the excess heat from the electrical motor by means of the flanges or fins.

In another embodiment, an internal fan (not shown) is arranged within the electrical motor casing in order to provide for air cooling. Also other components of the torque vectoring device may be provided with an internal fan for providing air cooling.

In an embodiment, an external fan (not shown) is arranged for providing air cooling to the electrical motor.

Alternatively, instead of an internal and/or external fan any means of providing airflow could be used to cool the electrical motor and/or other components of the torque vectoring device.

In an embodiment, the cooling of the power electronics and/or electrical motor is conducted by means of an oil pump pumping cooling hydraulic oil. The oil pump may be driven by transmission shaft speed or by electrical motor. The oil flow of the oil pump may be controlled by speed modulation and/or electrical or mechanical valves being positioned at different positions in the flow line to which the electrical motor is connected.

In an alternative embodiment, the stator, the windings, and or/the rotor of the torque vectoring device may be cooled directly by spraying oil thereon. Alternatively, an oil jacket or oil channels may be used in this regard.

In an embodiment, the torque vectoring device comprises an oil/air or oil/water heat exchanger. The heat exchanger may be integral with a housing or other components of the torque vectoring device or may be provided as a separate unit being operatively coupled to the torque vectoring device.

In an embodiment, transmission and/or hypoid gears form part of the oil cooling circuit.

In an embodiment, the torque vectoring device is provided with a passive oil cooling circuit. Here, at least some of the rotating parts of the torque vectoring system are used to pump cooling oil around the system via the passive oil cooling circuit. An oil reservoir may be used to receive incoming oil from the passive oil cooling circuit. By using an oil reservoir the oil may be cooled even further as it is possible to vent out excess heat from the reservoir e.g. via a closed continuous flow air conduit. The oil reservoir may be arranged such that the oil outlet of the reservoir is positioned vertically above the components to be cooled. In such an embodiment, gravity will influence the oil exiting the outlet, and thereby supplying the components to be cooled with oil without requiring a separate pump.

In an embodiment, the torque vectoring device comprises a liquid cooling circuit. The liquid cooling medium may be water or another liquid medium. In this embodiment, the torque vectoring device may be provided with a jacket or channels encompassing power electronics and/or the electrical motor, through which the cooling liquid flows. Using a heat transferring material, e.g. epoxy, heat may be transported from rotor/windings to the jacket. The jacket could be made integral with the housing or the stator itself.

In an embodiment, several liquid cooling circuits are provided in the torque vectoring device, each operating at a different temperature.

In an embodiment, cooling is provided by means of phase change heat transfer, using heat pipes to transfer heat from for example PE to ambient or air or oil.

In an embodiment, a cooling medium connected to an air conditioning unit is used to cool the power electronics or electrical motor. The air conditioning unit could e.g. be activated potentially only during peak or shock loading or when the environment is extreme. The air conditioning unit could be used as a complement with other cooling solutions as mentioned above for normal operation.

Actuation of Mode Shift

In an embodiment, the shift between the first, second, or third mode may be executed by a control means operating according to various principles.

Electro-Hydraulic Actuation

In an embodiment, a mode shift between either of the first, second, or third modes, is actuated by means of an electro-hydraulic actuation device (not shown). Here, an electrically or mechanically driven pump is provided.

In an embodiment, the electrically or mechanically driven pump is either a rotating or linear type.

In an embodiment, the electrically or mechanically driven pump could also be a hydrostatic or hydrodynamic pump type.

In an embodiment, the electrically or mechanically driven pump is a pressure controlling pump.

In an embodiment, the electrically or mechanically driven pump is controlled by electrically, mechanically or hydraulically actuated valves.

In an embodiment, the electrically or mechanically driven pump is a flow controlling pump.

Electro-Mechanical Actuation

In an embodiment, the electrical motor and/or rotating solenoid are direct acting or with a transmission such as a ball ramp, planetary gear, eccentric, screw, reduction gear, worm gear, cam, planetary screws, ball screw, shift fork, lever, and/or a roller ramp.

Pneumatic Actuation

In an embodiment, a mode shift between either of the first, second, or third modes, is actuated by means of vacuum or fluid pressure.

Electro-Magnetic

In an embodiment, a mode shift between either of the first, second, or third modes, is actuated by means of a direct acting solenoid or a solenoid acting through a mechanism.

Mechanical Actuation

In an embodiment, a mode shift between either of the first, second, or third modes, is actuated by means of direct mechanical actuation, controlled by e.g. speed, force, or torque.

Piezo Actuation

In an embodiment, a mode shift between either of the first, second, or third modes, is actuated by means of piezo actuation.

Phase Change Material Actuation

In an embodiment, a mode shift between either of the first, second, or third modes, is actuated by means of phase change material actuation using a memory material.

Detection of the Active Mode

Regardless of the type of mode actuation device, the active or present mode of the electrical motor may be detected by a mode detection device.

In an embodiment, the mode detection device comprises a separate sensor, e.g. a hall, resolver, encoder, potentiometer, GMR, MR, or PLCD for detecting the active mode of the electrical motor.

In an embodiment, the mode detection device comprises a pressure sensor for detecting the active mode of the electrical motor.

In an embodiment, the mode detection device comprises a motor current/voltage/speed monitoring unit for detecting the active mode of the electrical motor.

The electrical Motor

In an embodiment, the electrical motor is a switched reluctance motor (SRM). Such a motor in principle can only supply a lower torque than asked for at a defect rotor position signal. At disruption of one or more phase conductors, total loss of the control electronics, or shortcut, an SRM motor will not supply any torque at all, which is of great advantage for the safety.

In an embodiment, the electrical motor is an induction motor, e.g. such as a Squirrel-Cage Induction Motor (SCIM) or a Wound-Rotor Induction Motor (WRIM).

In an embodiment, the electrical motor is a separately excited synchronous motor, also referred to as a wound rotor synchronous motor (WRSM).

In an embodiment, the electrical motor is a variable reluctance motor or a synchronous reluctance motor.

In an embodiment, the electrical motor is a permanent magnet motor.

In an embodiment, the electrical motor is a brushless DC motor.

In an embodiment, the electrical motor is a DC motor.

In an embodiment, the electrical motor is arranged with or without rotor position sensor feedback.

Overall Aspects

In an embodiment, common hydraulic fluid, e.g. oils is used for both cooling and mode activation of the electrical motor.

In an embodiment, a hydraulic fluid of a first type is used for mode activation and a second hydraulic fluid of a second type is used for cooling.

In an embodiment, a hydraulic fluid of a first type is used for mode activation and a second hydraulic fluid of the first type is used for cooling.

In an embodiment, the differential is of bevel type, planetary type, kronenrad type.

In an embodiment, the torque vectoring device is provided in a modular design for axle combinations including RDM (rear drive module) without TV, RDM with Mechanical TV, RDM with Differential Brake, or axle with electrical drive and with or without mechanical power input.

In an embodiment, the torque vectoring device comprises two electrical motors, one for operating the torque vectoring mode and one for operating the hybrid mode.

In an embodiment, the torque vectoring device comprises bearings being arranged in such a way that losses are reduced in normal operation. Moreover, axial forces from helical gears are cancelled out.

In an embodiment, the transmission and/or hypoid gear and/or pinion bearings are actively lubricated, by a lubrication device.

In an embodiment, the activation of the lubrication device is controlled by the mode shift actuator.

In an embodiment, the activation of the lubrication device is controlled mechanically by axle torque level.

In an embodiment, the activation of the lubrication device is controlled mechanically by axle speed.

In an embodiment, the activation of the lubrication device is controlled by a separate actuator.

Functional Safety (FuSi)

In an embodiment, the mode shift actuator is arranged to activate the first mode in the event of loss of power. Hence, in this way the FuSi classification is reduced.

In an embodiment, the electrical motor is arranged to provide no torque in a safe state.

In an embodiment, the electrical motor, e.g. being of a SRM or WRSM type, is short circuited in a safe state. Hence, in this way the FuSi classification is reduced.

In an embodiment, the torque vectoring device is provided with a differential speed limitation to protect the electrical motor from overspeeding by means of a centrifugal clutch, viscous brake, friction brake or hydraulic brake. Hence, in this way the FuSi classification is reduced.

In an embodiment, the FuSi classification is reduced by torque measurement/estimation using a torque sensor or other sensor to approximate the torque.

In an embodiment, the FuSi classification is reduced by functional decomposition into parallel control paths, e.g. by means of an additional internal microcontroller or external ECU such as ESP/ABS-System.

In an embodiment, the FuSi classification is reduced by means of a plausibility check against vehicle dynamics model.

Power Electronics

In an embodiment, the power electronics are integrated in the electrical motor to avoid costly cables and contacts.

In an embodiment, the power electronics are integrated in the axle to avoid costly cables and contacts.

In an embodiment, the power electronics are contained in a stand-alone power electronics unit for simplified axle packaging and reduced environment requirements if placed in passenger compartment.

The invention claimed is:

1. A torque vectoring device for a vehicle, comprising an electrical motor (110) being connected to a differential mechanism (20) via a transmission (120) comprising a first planetary gear set (140a) and a second planetary gear set (140b), wherein the torque vectoring device further comprises at least one control means (130, 150) for changing the torque path of the transmission (120) between a first mode, in which the electrical motor (110) connects only to the input shaft of the differential mechanism (20) for hybrid drive mode, and a second mode, in which the electrical motor (110) connects to the input shaft and to the output shaft of the differential mechanism (20) for torque vectoring mode and wherein the sun gear of the second planetary gear set (140b) is fixed.

2. The torque vectoring device according to claim 1, wherein the electrical motor (110) is driving the sun gear of the first planetary gear set (140a), and wherein the input shaft of the differential mechanism (20) is connected to the planet carrier of the first planetary gear set (140a).

3. The torque vectoring device according to claim 2, wherein the ring gear of the first planetary gear set (140a) is connected to the ring gear of the second planetary gear set (140b) via a clutch (130b).

4. The torque vectoring device according to claim 3, further comprising a clutch (130a) for braking the ring gear of the first planetary gear set (140a).

5. The torque vectoring device according to claim 4, wherein the output shaft of the differential mechanism (20) is connected to the planet carrier of the second planetary gear set (140b).

6. The torque vectoring device according to claim 1, further comprising a reduction gear (140c) arranged between the electrical motor (110) and the differential mechanism (20).

7. The torque vectoring device according to claim 1, wherein the at least one control means (130, 150) is further configured to change the torque path of the transmission (120) into a third mode, in which the electrical motor (110) connects to the input shaft of the differential mechanism (20) at a lower reduction than the first mode.

8. A torque vectoring device for a vehicle, comprising an electrical motor (110) being connected to a differential mechanism (20) via a transmission (120) comprising a first planetary gear set (140a) and two additional gearings, wherein the torque vectoring device further comprises at least one control means (130, 150) for changing the torque path of the transmission (120) between a first mode, in which the electrical motor (110) connects only to the input shaft of the differential mechanism (20) via the planetary gear set and one of the additional gearings for hybrid drive mode, and a second mode, in which the electrical motor (110) connects to the input shaft via the planetary gear set and one of the additional gearings, and to the output shaft of the differential mechanism (20) via the other one of the additional gearings for torque vectoring mode.

9. The torque vectoring device according to claim 8, wherein the control means (150) forms a dog clutch being biased towards a neutral position such that it may be disengaged from either torque vectoring mode or hybrid mode also when there is a torque from the electrical motor (110).

10. The torque vectoring device according claim 8, wherein the control means (150) comprises a splined shifting sleeve, and a friction type clutch, wherein the splined shifting sleeve is spring loaded to neutral position, and wherein the clutch enables additional torque limit and monitoring function by clutch pressure control, since the torque during torque vectoring can never be higher than the applied pressure.

11. A vehicle axle, comprising a torque vectoring device (100) comprising an electrical motor (110) being connected to a differential mechanism (20) via a transmission (120) comprising a first planetary gear set (140a) and two additional gearings, wherein the torque vectoring device further comprises at least one control means (130, 150) for changing the torque path of the transmission (120) between a first mode, in which the electrical motor (110) connects only to the input shaft of the differential mechanism (20) via the planetary gear set and one of the additional gearings for hybrid drive mode, and a second mode, in which the electrical motor (110) connects to the input shaft via the planetary gear set and one of the additional gearings, and to the output shaft of the differential mechanism (20) via the other one of the additional gearings for torque vectoring mode.

12. A transfer case, comprising a torque vectoring device (100) comprising an electrical motor (110) being connected to a differential mechanism (20) via a transmission (120) comprising a first planetary gear set (140a) and a second planetary gear set (140b), wherein the torque vectoring device further comprises at least one control means (130, 150) for changing the torque path of the transmission (120) between a first mode, in which the electrical motor (110) connects only to the input shaft of the differential mechanism (20) for hybrid drive mode, and a second mode, in which the electrical motor (110) connects to the input shaft and to the output shaft of the differential mechanism (20) for torque vectoring mode.

13. The transfer case according to claim 12, comprising an input axle, a front output axle, and a rear output axle, wherein said torque vectoring device (100) is arranged at the rear output axle.

* * * * *